US007356541B1

(12) United States Patent
Doughty

(10) Patent No.: US 7,356,541 B1
(45) Date of Patent: Apr. 8, 2008

(54) PROCESSING BUSINESS DATA USING USER-CONFIGURED KEYS

(75) Inventor: Steven G. Doughty, Plano, TX (US)

(73) Assignee: Computer Sciences Corporation, Austin, TX (US)

(*) Notice: Subject to any disclaimer, the term of this patent is extended or adjusted under 35 U.S.C. 154(b) by 887 days.

(21) Appl. No.: 09/699,056

(22) Filed: Oct. 27, 2000

Related U.S. Application Data

(60) Provisional application No. 60/162,567, filed on Oct. 29, 1999.

(51) Int. Cl.
*G06F 7/00* (2006.01)
*G06Q 40/00* (2006.01)

(52) U.S. Cl. .................... 707/102; 705/35; 705/36; 705/38; 705/39; 707/6; 707/7; 707/101

(58) Field of Classification Search ............ 707/103 R, 707/102, 100, 1, 3, 4, 6, 10, 104.1, 200; 705/1–45
See application file for complete search history.

(56) References Cited

U.S. PATENT DOCUMENTS

| 4,878,167 A | 10/1989 | Kapulka et al. |
| 5,099,422 A | 3/1992 | Foresman et al. |
| 5,191,522 A | 3/1993 | Bosco et al. |

(Continued)

FOREIGN PATENT DOCUMENTS

| EP | 0 280 773 | 9/1988 |

(Continued)

OTHER PUBLICATIONS

"@ Fault A Commitment to Consistency," Computer Sciences Corporation, Copyright 2000, pp. 1-2.

(Continued)

*Primary Examiner*—Ella Colbert
(74) *Attorney, Agent, or Firm*—Meyertons, Hood, Kivlin, Kowert & Goetzel, P.C.; Eric B. Meyertons

(57) ABSTRACT

A system, method and carrier medium for locating processing parameter values in a Financial Service Organization (FSO) computer system using pre-configured key definitions, key values, and key value search masks. The key definitions, key values, processing parameter values and key value search masks may be identified by a user during a configuration of the FSO computer system. The FSO computer system may include one or more processing parameters. Each processing parameter may have one key definition, one or more key values with one processing parameter value assigned to each key value, and one or more key value search masks. The FSO computer system may include a database for storing the key definitions, key values and their associated processing parameter values, and key value search masks. The key definitions, key values and their associated parameter values, and key value search masks may be stored in tables in the database. The FSO computer system may be configured to construct processing key values from one or more data element values in the FSO computer system. A key definition may include one or more key elements. A key element may be used to locate a data element value in the FSO computer system, and to format the data element value into a key element value in the processing key value. A key value search mask may be used to specify the substitution of a wildcard value for a data element value in a key element value. The FSO computer system may be configured to search the database for a key value that matches the processing key value. A key value may include one or more key element values corresponding to the key elements in the key definition for the key value. One or more of the key element values may be set to a wildcard key element value. The FSO computer system may be configured to read the processing parameter value associated with the key value from the database in response to finding a matching key value for the processing key value. The FSO computer system may use the located processing parameter value in the processing of FSO transaction data.

15 Claims, 12 Drawing Sheets

U.S. PATENT DOCUMENTS

| | | | |
|---|---|---|---|
| 5,201,044 | A | 4/1993 | Frey, Jr. et al. |
| 5,233,513 | A | 8/1993 | Doyle |
| 5,386,566 | A | 1/1995 | Hamanaka et al. |
| 5,394,555 | A | 2/1995 | Hunter et al. |
| 5,434,994 | A | 7/1995 | Shaheen et al. |
| 5,455,947 | A | 10/1995 | Suzuki et al. |
| 5,483,632 | A | 1/1996 | Kuwamoto et al. |
| 5,499,330 | A | 3/1996 | Lucas et al. |
| 5,500,609 | A * | 3/1996 | Kean .......................... 326/41 |
| 5,504,674 | A | 4/1996 | Chen et al. |
| 5,523,942 | A | 6/1996 | Tyler et al. |
| 5,524,205 | A | 6/1996 | Lomet et al. |
| 5,550,976 | A | 8/1996 | Henderson et al. |
| 5,586,310 | A | 12/1996 | Sharman |
| 5,638,508 | A | 6/1997 | Kanai et al. |
| 5,689,706 | A | 11/1997 | Rao et al. |
| 5,710,915 | A * | 1/1998 | McElhiney .................... 707/3 |
| 5,745,901 | A | 4/1998 | Entner et al. |
| 5,768,505 | A | 6/1998 | Gilchrist et al. |
| 5,768,506 | A | 6/1998 | Randell |
| 5,797,134 | A | 8/1998 | McMillan et al. |
| 5,832,481 | A | 11/1998 | Sheffield |
| 5,870,711 | A | 2/1999 | Huffman |
| 5,873,066 | A | 2/1999 | Underwood et al. |
| 5,881,379 | A | 3/1999 | Beier et al. |
| 5,892,905 | A * | 4/1999 | Brandt et al. ............... 713/201 |
| 5,907,848 | A | 5/1999 | Zaiken et al. |
| 5,930,759 | A | 7/1999 | Moore et al. |
| 5,933,816 | A | 8/1999 | Zeanah et al. |
| 5,937,189 | A | 8/1999 | Branson et al. |
| 5,950,169 | A | 9/1999 | Borghesi et al. |
| 5,987,434 | A | 11/1999 | Libman |
| 5,991,733 | A | 11/1999 | Aleia et al. |
| 6,038,393 | A | 3/2000 | Iyengar et al. |
| 6,049,665 | A | 4/2000 | Branson et al. |
| 6,064,983 | A | 5/2000 | Koehler |
| 6,081,832 | A | 6/2000 | Gilchrist et al. |
| 6,092,049 | A | 7/2000 | Chislenko et al. |
| 6,105,007 | A | 8/2000 | Norris |
| 6,115,690 | A | 9/2000 | Wong |
| 6,134,582 | A | 10/2000 | Kennedy |
| 6,163,770 | A | 12/2000 | Gamble et al. |
| 6,185,540 | B1 | 2/2001 | Schreitmueller et al. |
| 6,226,623 | B1 | 5/2001 | Schein et al. |
| 6,236,975 | B1 | 5/2001 | Boe et al. |
| 6,336,096 | B1 | 1/2002 | Jernberg |

FOREIGN PATENT DOCUMENTS

| | | |
|---|---|---|
| EP | 0 465 018 | 1/1992 |
| EP | 0 836 779 | 4/1998 |
| EP | 0 926 608 | 6/1999 |
| JP | 11312166 A * | 4/1998 |

OTHER PUBLICATIONS

Merlin, Jr., William F., "Colossus: What We Know Today," The Merlin Law Group, Aug. 2000, Tampa, FL, pp. 1-8.
Merlin, Jr., William F., "Collision Course With The Colossus Program: How To Deal With It," The Merlin Law Group, May 2000, Tampa, FL, pp. 1-17.
Merlin, Jr., William F., "Overcoming Allstate's Trade Secrets and Work-Product Objections," The Merlin Law Group, Mar. 2000, Tampa, FL, pp. 1-31.
Mead, Jay, Technical Communication, Aug. 1998, V. 45, N.3, p. 353-380.
Scopus Introduces World's Most Complete Call Center Solution for Financial Services; PR Newswire dated Nov. 5, 1997.
Borland, Russel; "Running Microsoft Outlook 97", Microsoft Press, 1997.
Juhl, Randy P., "The OTC Revolution"; Drugtopics.com; Mar. 3, 1997, pp. 1-9.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 59 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.
Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998, 50 pages.
Connections to the Americas, vol. 4, No. 3, Computer Sciences Corporation, May/Jun. 1998, 48 pages.

Connections to the Americas, vol. 4, No. 4, Computer Sciences Corporation, Sep./Oct. 1998, 62 pages.

Insurance Connections, Computer Sciences Corporation, Feb./Mar. 1999, 52 pages.

Banking Connections, Computer Sciences Corporation, Apr./May 1999, 44 pages.

Insurance Connections, Computer Sciences Corporation, Jun./Jul. 1999, 56 pages.

Banking Connections, Computer Sciences Corporation, Aug./Sep. 1999, 52 pages.

Insurance Connections, Computer Sciences Corporation, Oct./Nov. 1999, 56 pages.

Cost Containment: Products and Solutions for the Property and Casualty Insurance Industry, Computer Sciences Corporation, Oct. 1999, 40 pages.

Banking Connections, Computer Sciences Corporation, Dec. 1999, 48 pages.

Insurance Connections, Computer Sciences Corporation, Feb./Mar. 2000, 60 pages.

Banking Connections, Computer Sciences Corporation, Apr./May 2000, 48 pages.

Insurance Connections, Computer Sciences Corporation, Jun./Jul. 2000, 43 pages.

Insurance Connections, Computer Sciences Corporation, Sep./Oct. 2000, 43 pages.

Banking Connections, Computer Sciences Corporation, Nov./Dec. 2000, 48 pages.

International search report application No. PCT/ US 00/18016, mailed Nov. 10, 2000.

International search report application No. PCT/US 00/18020 mailed Nov. 10, 2000.

* cited by examiner

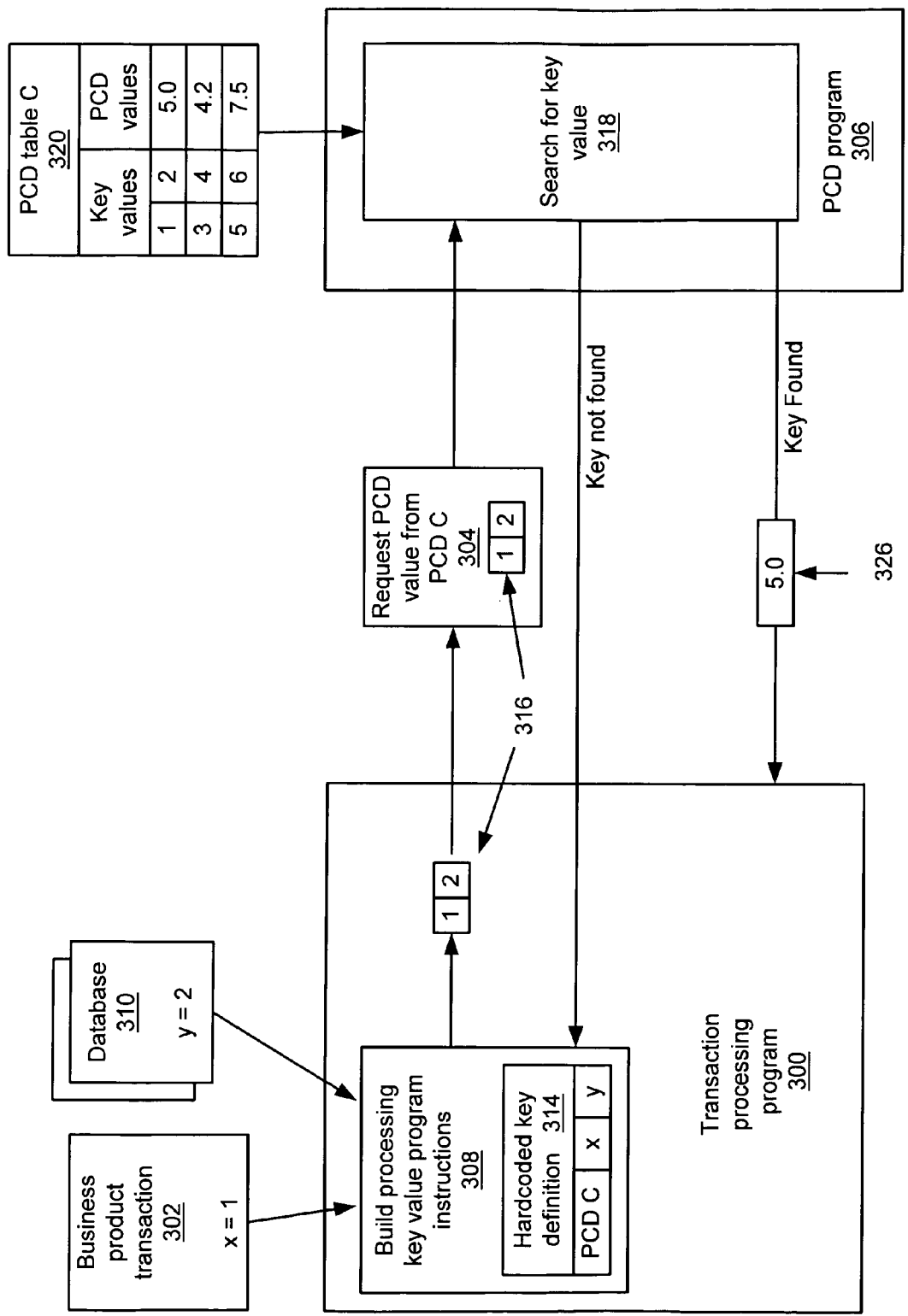
FIG. 2 - Prior Art

SEARCH MASKS 183

180

| SEARCH ORDER | KEY ELEMENT: | X | W | Z |
|---|---|---|---|---|
| 1 | | = | = | = |
| 2 | | = | * | = |
| 3 | | = | * | * |
| 4 | | * | * | * |

| 202 | 204 |
| --- | --- |
| PCD 1 | User-defined key definition 1 |
| PCD 2 | User-defined key definition 2 |
| PCD ... | ... |
| PCD n | User-defined key definition n |

| 206 | 208 |
| --- | --- |
| PCD 1 | Search mask table 1 |
| PCD 2 | Search mask table 2 |
| PCD ... | ... |
| PCD n | Search mask table n |

|  | PROCESSING KEY VALUES 193 | | | PCD TABLE ROW 194 | TRANSACTION CHARGE 195 |
|---|---|---|---|---|---|
| KEY ELEMENT: | X | W | Z | | |
| SEARCH 1: | 12 | DIS | Y | 2 | 8 |
| SEARCH 2: | 12 | MSC | Y | - | - |
|  | 12 | * | Y | 4 | 13 |
| SEARCH 3: | 12 | MSC | N | - | - |
|  | 12 | * | N | - | - |
|  | 12 | * | * | 3 | 12 |
| SEARCH 4: | 14 | MSC | N | - | - |
|  | 14 | * | N | - | - |
|  | 14 | * | * | - | - |
|  | * | * | * | 7 | 14 |

FIG. 11

PROCESSING BUSINESS DATA USING USER-CONFIGURED KEYS

PRIORITY CLAIM

This application claims the benefit of U.S. Provisional Application No. 60/162,567 entitled "Processing Business Data Using User-Configured Keys," filed Oct. 29, 1999.

BACKGROUND OF THE INVENTION

1. Field of the Invention

The present invention generally relates to computer software programs and databases to be used in Financial Service Organizations. More particularly, the present invention relates to a system and method for processing business data in a Financial Service Organization (FSO) production system.

2. Description of the Related Art

FSOs such as banks, credit unions, etc., use computer systems running software programs to process FSO transactions. The FSO systems may include one or more databases for storing data. The databases may include groups of data such as the master files of customer account information, transaction data sets such as customer credit card purchase transactions, processing data such as the processing parameters used in processing transactions, and history data such as log files of daily activities for batch processing.

The processing parameters used in the processing of transactions in an FSO system may be embedded in the source code of the FSO system software programs, or the processing parameters may be stored in one or more tables in the FSO system database. Processing parameters may be used to apply business logic to the transactions during processing. A processing parameter may have different values for different transactions based upon one or more attributes of the transactions. For example, the processing parameter values used in processing a customer credit card transaction made at one department store may be different than the processing parameter values used in processing a customer credit card transaction made at a different department store. Attributes of a transaction may be defined by one or more data elements in the transaction or one or more data elements in a master file associated with the transaction. The attributes could be, for example, the name of a bank issuing the credit card to the customer, or the type of credit card (e.g., gold, platinum, etc.). The FSO system may examine the values of one or more data elements (e.g., gold, platinum, etc.) in the transaction data or master files to determine the value of a processing parameter for the transaction. The FSO system may examine the values of one or more data elements in the transaction data or master files to determine the value of a processing parameter for the transaction. A set of data elements useable to determine the value of a processing parameter for a transaction may be referred to as a key definition for the processing parameter. Data element values may be extracted from a transaction data set and an associated master file by using the data elements in the key definition to locate the data element values. The data element values may be combined to form a key value for the processing parameter for the transaction.

Key definitions and the construction of key values are hardcoded in the source code for the FSO system software programs. Modifying the key definitions and the construction of key values from the key definitions involves modifying the source code for all software programs that use the key definitions, recompiling and relinking the programs, reinstalling the software programs, and possibly modifying the data dictionary and database structure used by the software programs. If the software programs are used by more than one FSO, and if one of the FSOs requires customized key definitions, customization of the key definitions and key value construction for one of the FSOs requires creating and maintaining a customized copy of the source code for the software programs.

In some FSO systems, processing parameters and the key values used to identify and select the processing parameters may be hardcoded in the source code for the FSO system software programs. Modifying the processing parameters and key values for these systems may involve modifying the source code for all software programs that use the processing parameters, recompiling and relinking the programs, and reinstalling the software programs. In other FSO systems, the processing parameters and key values may be stored in the FSO system database. In these systems, the processing parameters and key values in the database and the key definitions and key value construction in the source code must be synchronized. Modifying the processing parameters and key values in the database may also require modifying the source code and rebuilding the programs as described above.

As a result of the hardcoding of processing parameters and keys, FSO systems are not flexible in the configuration and use of processing parameters. This inflexibility makes it difficult for the FSO to configure an FSO system to meet custom transaction processing requirements.

The following is, hereby, incorporated by reference: Data retrieval method and apparatus with multiple source capability (U.S. Pat. No. 6,023,694), Graphical user interface for relating key index properties to database table columns (U.S. Pat. No. 5,553,218), Index managing method in database managing system (U.S. Pat. No. 5,806,058) and Relational database management system for chemical structure storage, searching and retrieval (U.S. Pat. No. 5,950,192).

SUMMARY OF THE INVENTION

A system, method and carrier medium for locating processing parameter values in a Financial Service Organization (FSO) computer system using pre-configured key definitions, key values, and key value search masks. In one embodiment, data may be stored in tables in a database. In one embodiment, a key definition table, one or more process control data (PCD) tables for storing processing parameter values and key values, and one or more search mask tables for storing key definition-based search masks for the key values in the PCD tables may be provided.

In one embodiment, a key definition may be configured for use in building a processing key value from data associated with an FSO customer transaction in response to a computer program executing on the FSO computer system requesting a processing parameter value to be used in the processing of the FSO customer transaction. The processing key value may be used in locating the processing parameter value in a PCD table in the FSO computer system database. The key definition may also be used during the comparison of processing key values to pre-configured key values stored in a PCD table. If a pre-configured key value that matches the processing key value is found in the PCD table, a processing parameter value stored with the pre-configured key value in the PCD table may be returned to the requesting computer program.

The key definition may include one or more data elements, or key elements. The key elements may be arranged in a sequence in the key definition. The key elements may include information describing the location and data format of data element values in the FSO system database. The location information in a key element may be used in locating a data element value in the database during the building of a processing key value, wherein the data element value is to be included as part of the processing key value. The data format information may be used to specify the data type, size and other data attributes during the building of a processing key value. The key definition may be stored in the database in the FSO system. In one embodiment, the key definition may be stored in a key definition table in the database.

Processing parameter values may be configured for use during the processing of data, including FSO transactions, in the FSO computer system. Key values may be configured for use in locating the processing parameters in the FSO computer system. In one embodiment, processing parameter values and key values may be stored in a process control data (PCD) table in the database, with one row in the PCD table including one or more fields for storing a key value and one or more fields for storing processing parameter values associated with the key value. In one embodiment, there may be one PCD table in the database for each processing parameter in the FSO system, with each row in the table including one unique key value for the processing parameter, and each row also including the processing parameter value or values locatable using the unique key value. In one embodiment, a key definition may be used to format the user interface for entering key element values. A key element value may be entered for each key element in the key definition, and the key element values may be combined to construct a key value. In one embodiment, wildcard values may be entered as key element values in key elements. In one embodiment, a wildcard value may be the low collating value of the data type of the key element.

In one embodiment, a search mask may include one or more search mask fields. In one embodiment, a key definition may be used to format the search masks, with one search mask field for each key element in the key definition. Each search mask field in a search mask may be set to a search mask field value. In one embodiment, the search masks for a processing parameter may be stored in a search mask table in the database, with one row in the table storing one search mask. In one embodiment, the search masks for a processing parameter may be stored in the search mask table in the database in a sequence in which the search masks may be used in searching for a processing key value in the key values for the processing parameters. In one embodiment, wildcard mask field values and equal mask field values may be entered as mask values in search mask fields. In one embodiment, a wildcard mask field value may specify that the low collating value of the data type of the search mask field is to be written to a corresponding key element when building a processing key value from data element values in the FSO system database. In one embodiment, an equal mask field value may specify that the data element value from the FSO system database is to be written to a corresponding key element when building a processing key value from data element values in the FSO system database.

In one embodiment of a system for processing business data in an FSO transaction processing computer system using user-configured key definitions, a key building program may be provided. The key building program may be configured to accept requests for processing parameters from FSO transaction processing programs executing on the FSO computer system. The key building program may be configured to access a key definition table in the FSO system database and to read a key definition for a processing parameter in response to receiving a request for the processing parameter. The key building program also may be configured to access a search mask table in the FSO system database for a processing parameter in response to receiving a request for the processing parameter.

A key building program may be configured to build a processing key value for a processing parameter from one or more data element values in the FSO system database in response to receiving a request for the processing parameter. In one embodiment, the key building program may be configured to locate data element values in the FSO system database using data element location information stored in the a key definition. In one embodiment, each of one or more key elements in a key definition may specify the location and data format of one data element in the FSO system database. The key building program may be configured to use the data element information stored in the key elements of the key definition to locate data elements in the FSO system database and to read the data element values from the FSO system database. The key building program may be configured to write each data element value read from the FSO system database to a corresponding key element in a processing key. In one embodiment, the key element values in the processing key may be in combination referred to as the processing key value.

In one embodiment, a key building program may be configured to read a first search mask from a search mask table for a processing parameter in response to receiving a request for the processing parameter. In one embodiment, the key building program may be configured to examine a search mask field in a search mask corresponding to a key element in a processing key when building the processing key value. The key building program may be configured to read a data element value from the FSO system database and write the data element value to a key element in response to a corresponding search mask field value being an equal mask field value. The key building program may be configured to write a wildcard, or low collating value, for a corresponding data element type to a key element in response to a corresponding search mask field value being a wildcard mask field value.

In one embodiment of a system for processing business data in an FSO transaction processing computer system using user-configured key definitions, a PCD program may be provided. In one embodiment, the PCD program may be configured to receive processing key values from a key building program. The PCD program may be configured to locate a PCD table for a processing parameter in the FSO system database in response to receiving a processing key value for the processing parameter. In one embodiment, the PCD program may compare the processing key value to the pre-configured key values stored in the rows of the PCD table. In one embodiment, the PCD program may read a processing parameter value from a row of the PCD table in response to the processing key value matching the pre-configured key value stored in the row of the PCD table. The processing parameter value may be a single data value or may be a group of two or more data values. In one embodiment, the PCD program may send the processing parameter value to the key building program in response to reading the processing parameter value from the PCD table, and the key building program may send the processing parameter value to the FSO transaction processing program that requested the processing parameter value. In another embodiment, the PCD program may send the processing parameter value directly to the FSO transaction processing program that requested the processing parameter value.

In one embodiment, the PCD program may be configured to send a message to the key building program in response to the PCD program not finding a match for the processing key value among the pre-configured key values in the PCD table for the processing parameter. The message may inform the key building program that no match was found for the processing key value submitted to the PCD program by the key building program. In one embodiment, the key building program may be configured to read a second search mask from the search mask table for the processing parameter in response to receiving a message from the PCD program that a matching pre-configured key value for the processing key value constructed using the first search mask was not found in the PCD table. The key building program may be configured to construct a second processing key value and submit the second processing key value to the PCD program. The PCD program may be configured to search for a match to the second processing key value among the pre-configured key values in the PCD table for the processing parameter. The PCD program may be configured to send a message to the key building program in response to not finding a match to the second processing key value in the PCD table. In one embodiment, the key building program and PCD program may be configured to continue reading search masks, constructing or preparing processing key values, and searching the PCD table for the processing key values until a matching pre-configured key value is found for a processing key value, or until all of the search masks have been used to construct processing key values with no matching pre-configured key value found for any of the processing key values. In one embodiment, the key building program may be configured to notify the FSO transaction processing program that no processing parameter value was located for the requesting processing parameter in response to not finding a match for any of the constructed processing key values.

In one embodiment, the key definitions, key values, processing parameter values, and search masks may be constructed and stored during the configuration of the FSO system. Configuration of the FSO system may occur at the time the FSO system software programs and databases are initially installed and set up for processing FSO transactions. Configuration of the FSO system may also occur after the initial configuration performed during the installation of the FSO system. A configuration of the FSO system that occurs after the initial configuration may be called a reconfiguration of the FSO system. During reconfiguration, the key definitions, key values, processing parameter values, and search masks constructed during the initial configuration may be modified or deleted, and new key definitions, key values, processing parameter values, and search masks may be added to the FSO system. Some data may be processed differently in the FSO system after a reconfiguration of the FSO system than before the reconfiguration. For example, a key value may be assigned a different processing parameter value in a PCD table after a reconfiguration, and thus a different processing parameter value may be returned to a program for a processing key value after the reconfiguration than would have been returned before the reconfiguration.

BRIEF DESCRIPTION OF THE DRAWINGS

FIG. 2 illustrates a system for processing FSO business data using hardcoded key definitions and key construction;

FIG. 6 illustrates one embodiment of a search mask table with examples of search masks that may be applied to the PCD table of FIG. 5;

FIG. 7 illustrates one embodiment of a structure for a database table for storing key definitions;

FIG. 8 illustrates one embodiment of a structure for a database table for referencing search masks;

FIG. 11 illustrates examples of inputs to and results from one embodiment of a search process that may be applied to PCD tables as depicted in FIG. 5 using search mask tables as depicted in FIG. 6;

FIG. 12b is a continuation of the flow diagram of FIG. 12a; and

Figure 1A:
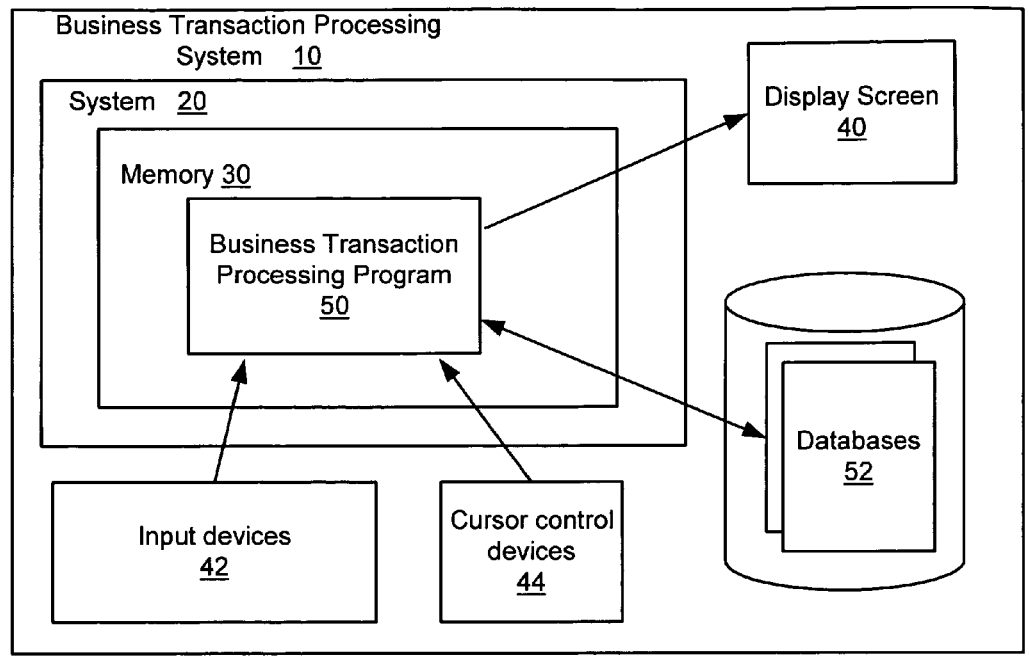
FIG. 1a is a block diagram illustrating one embodiment of an FSO computer system for processing FSO business data using pre-configured key definitions, key values, and processing values.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

The term "computer system" as used herein generally describes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory medium" includes an installation medium, e.g., a CD-ROM, or floppy disks; a volatile computer system memory such as DRAM, SRAM, EDO RAM, Rambus RAM, etc.; or a non-volatile memory such as optical storage or a magnetic medium, e.g., a hard drive. The term "memory" is used synonymously with "memory medium" herein. The memory medium may comprise other types of memory or combinations thereof. In addition, the memory medium may be located in a first computer in which the programs are executed, or may be located in a second computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for configuring the FSO system software programs and databases in an FSO system, and for processing FSO transactions in the FSO system, as described herein. The software program(s) may be implemented in any of various ways, including procedure-based techniques, component-based techniques, and/or object-oriented techniques, among others. For example, the software program(s) may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Examples of operating systems may include, but are not limited to: Windows NT available from Microsoft Corporation, and; the MVS and OS/390 operating systems available from IBM. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as the data is required by a program.

As used herein, a Financial Service Organization (FSO) is a business organization that provides financial services to customers and client organizations. As used herein, the term customer generally refers to an individual, and client organization generally refers to other businesses, including retail businesses and other FSOs. Services provided to customers and client organizations include credit products, such as loans and credit cards. An FSO may also provide services to client organizations such as credit card transaction processing. Examples of FSOs include, but are not limited to, banks and credit unions. An FSO that issues credit cards and processes credit card transactions may be referred to as a credit card institution. An FSO may include one or more organizational units. Examples of organizational units include, but are not limited to, main offices, divisions, regional offices, and branch offices.

As used herein, an FSO transaction may be defined as an occurrence of a service provided to a customer or client organization. Examples of FSO transactions include, but are not limited to, financial transactions such as deposits, withdrawals, loan application servicing, and credit card application servicing. FSO transactions may also include services related to financial products such as loans and credit cards previously issued to FSO customers and client organizations. These services may include processing of credit card purchases and collection of payments.

An FSO system may include a data dictionary. A data dictionary may be defined as a collection of descriptions of data items in the database. A description of a data item in a database may be called a data element. A data item may be referred to as a data element value. A data element in the data dictionary may describe attributes of a data element value in the database. Examples of attributes of data element values include, but are not limited to: location in the database, size, and data type. For example, an FSO system data dictionary may describe the data elements involved in credit card processing. The data dictionary may describe each of the data elements in the database for credit card processing. Groups of data such as master files and transaction data sets may comprise data elements defined in the data dictionary. Examples of data elements in an FSO data dictionary include, but are not limited to: customer name, credit card type, and card issuer.

In the context of this application, a key is one or more data elements in a database record or group of records that may be used to identify the record or group of records. For example, a record for storing information about an individual may have a name data element. The name data element may be used as a key to identify a particular individual's record in the database. A key value is an instance of a key in the database. In the example above, an example of a key value for a name data element used as a key might be "John Smith." In some examples, not all data elements in a database may be available for use in keys. Data elements that are available for use in keys may be referred to as key elements.

The format of a key may be stored in a key definition. A key definition may include one or more key elements that in combination make the key. During configuration of an FSO system, key definitions may be used in creating key values for records or groups of records in the database. During processing, key definitions may be used by the FSO system to create key values and to read key values stored in the database. During the processing of a transaction, the FSO system may create a key value from a transaction-related data using a key definition to extract data element values from the transaction-related data, and may compare the key value to key values stored in the database while searching for a matching key value. A key value created during processing from a key definition and a transaction-related data may be referred to as a processing key value.

The FSO system database may include processing parameters used in processing transactions. Processing parameters may be used to apply business logic to the transactions during processing. An example of a transaction processed in an FSO system is a credit card purchase transaction. An example of a processing parameter is a credit card purchase transaction price that may be charged to a client of a credit card institution for the processing of a credit card purchase transaction. An instance of a processing parameter in the database may be referred to as a processing parameter value. For example, an instance of a credit card purchase transaction price might be "$1.50." In some cases, a processing parameter value may include more than one data value. For example, a matrix of data values used in transformation functions on tables of data may be stored as a processing parameter value.

An FSO transaction processing software program may use one or more processing parameters during the processing of a transaction. A processing parameter may have a different processing parameter value for different transactions. The software program may examine the values of one or more data elements in the transaction data and master files to determine the processing parameter value for the transaction. A combination of data elements used to determine the processing parameter value may be referred to as the key definition for the processing parameter. The combination of data element values constructed from the key definition may be referred to as a key value. For example, a software program for processing credit card transactions for a credit card institution may use the credit card issuer and card type to determine what transaction price to charge a client of the credit card institution for processing a credit card transaction. The key definition in this example includes the credit card issuer data element and card type data element, and the key value is constructed from the values for the credit card issuer data element and card type data element read from the credit card transaction data or from a master file associated with the transaction.

In one embodiment, processing parameter values and the key values used to identify the processing parameter values may be stored in tables in the database. The tables in the database that store the processing parameter values and key values may be referred to as Process Control Data (PCD) tables or processing parameter tables. In one embodiment, there may be one PCD table for each processing parameter in the FSO system.

Processing parameters are one example of parameters that may be stored in PCD tables and located using key definitions as described herein. Examples of other types of parameters that may be stored in PCD tables are default parameters and definition parameters. Default parameters may be used to fill in default information in records in the database when they are created. For example, when a new customer account is created, one or more fields in the customer account master file may be filled with default parameter values. Default parameter values may be retrieved from PCD tables using key values constructed from the PCD key definitions and data element values from the customer account master file. Definition parameters are text or numeric values that are located using key values as codes. An example is a text error message that may be looked up using a numeric error code as a key value.

During processing, an FSO transaction may be stored as a record or file in the FSO system. In one embodiment, the FSO transaction may be stored in the FSO system database. A portion of the FSO transaction record may be read into system memory during processing. An FSO transaction record may include one or more data elements. The data elements included in an FSO transaction record may be defined in the data dictionary. The data elements in the transaction record may describe the various attributes of the transaction. For example, the data elements in a credit card transaction record may include items such as the customer's name, account numbers, credit card type, card issuer, date of the transaction, and the business at which the transaction originated.

An example of an FSO that may use an FSO computer system as described herein is a credit card institution. A credit card institution may issue credit cards to customers and client institutions of the FSO. The credit card institution may also issue credit cards on behalf of client businesses such as department stores. The credit card institution may also acquire and process credit card transactions from customers and client businesses such as department stores. For example, a credit card institution may issue its own credit card. Continuing the example, the credit card institution may also have client department stores. The credit card institution may issue a credit card under a department store's name, and may collect and process all credit card transactions for the department store. The credit card institution may charge a fee for each transaction processed. Some of the credit card transactions collected by the credit card institution may be transactions for credit cards not issued by the credit card institution. These transactions may be forwarded to the FSO that issued the card. In turn, other FSOs may forward credit card transactions to the credit card institution. Transactions for credit cards issued by the credit card institution may be processed by the credit card institution.

In the above example, the fee charged for each transaction, also called the merchant transaction price, is an example of a processing parameter for an FSO system in a credit card institution. One embodiment of an FSO system database in a credit card institution may include a merchant transaction pricing PCD table. The merchant transaction pricing PCD table may include one or more merchant transaction pricing values. Each merchant transaction pricing value may be associated with one unique key value in the table. The key values in the PCD table may be constructed using a key definition. Each processing parameter in the FSO system, and thus each PCD table, may be associated with a key definition. In one embodiment, the FSO system database may include a key definition table for storing key definitions in the FSO system.

A key definition may include one or more data elements from the data dictionary. As an example, the merchant transaction pricing parameter described above may have a key definition that includes one or more data elements. Examples of data elements that may be included as fields in the merchant transaction pricing parameter key definition include card issuer, card type, on us/not on us, and transaction type. A card issuer may be the brand of card, for example, VISA, MasterCard, Discovery, etc. Examples of card types may include, but are not limited to: "gold" and "platinum" cards issued by some card issuers. On us/not on us refers to whether the FSO processing the transaction also issued the credit card. "On us" may mean that the FSO did issue the card. "Not on us" may mean that another FSO issued the card, and thus the transaction may be forwarded to the other FSO for processing. The term "transaction type" may refer to the way the transaction was entered; examples of transaction types may include, but are not limited to: manual, electronic, and telephone transactions. A manual credit card transaction may be a credit card transaction that is entered by hand and imprinted with a credit card imprint machine. An electronic transaction may be a credit card transaction where the magnetic strip on a credit card is read electronically. A telephone transaction may be a credit card transaction performed by telephone call.

FIG. 1a—A Block Diagram Illustrating One Embodiment of an FSO Computer System for Processing FSO Business Data Using Pre-Configured Key Definitions, Key Values, and Processing Values In FIG. 1a, an embodiment of an FSO business transaction processing system 10 may include a system 20 (e.g., computer system), a display screen 40 connected to the system, and one or more databases 52 residing on external storage. System 20 includes memory 30 configured to store computer programs for execution on system 30, and a central processing unit (not shown) configured to execute instructions of computer programs residing on system 20. Business transaction processing program 50 may be stored in memory 20. System 20 may also include one or more input devices 42 such as a keyboard for entering data and commands into program 50 and one or more cursor control devices 44 such as a mouse.

Figure 1B:
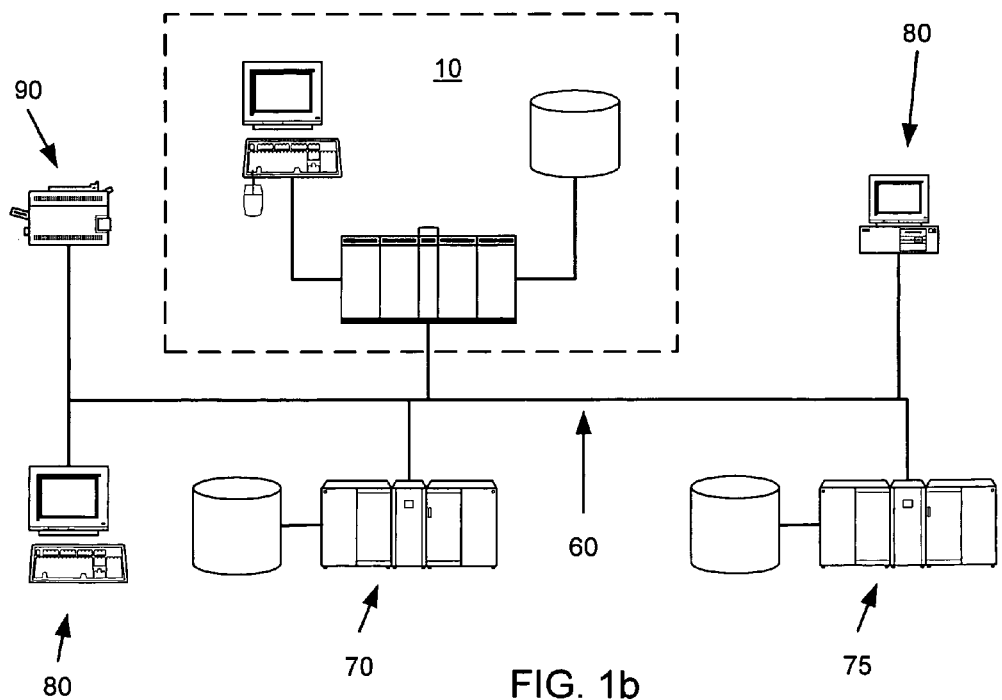
FIG. 1b illustrates one embodiment of an FSO computer system integrated into a networked system for processing FSO business data.

FIG. 1b—One Embodiment of an FSO Computer System Integrated into a Networked System for Processing FSO Business Data FIG. 1b illustrates one embodiment of a networked system configured for processing FSO business data. Network 60 may be a local area network or wide area network, and may include communications links including, but not limited to, Ethernet, token ring, Internet, satellite and modem. An FSO computer system 10 as illustrated in FIG. 1a may be connected to network 60. One or more user workstations 80 may be connected to network 60 and may be used by users of the FSO computer system to enter and modify data, initiate data processing tasks, and monitor the processing of data in the FSO computer system. One or more printers 90 for outputting hardcopy reports on FSO system data may also be connected to network 60. One or more other FSO computer systems 70 may also be connected to network 60. In one embodiment, one or more computer systems 75 of client businesses of the FSO may also be connected to network 60. Client businesses of the FSO may forward business transactions to the FSO computer system for processing.

FIG. 2—One Embodiment of a System for Processing FSO Business Data Using Hardcoded Key Definitions and Key Construction FIG. 2 illustrates one embodiment of a system for processing FSO business data using hardcoded key definitions and key construction. The system using hardcoded key definitions may include a transaction processing program 300 and a PCD program 306. The system may also include a PCD table C 320 and a database 310. Database 310 may include customer account master files.

Transaction processing program 300 may receive a business product transaction 302 for processing. Transaction processing program 300 may require a PCD value from PCD table C 320 for processing business product transaction 302. Transaction processing program 300 may include build processing key value program instructions 308 for building a processing key value for locating a PCD value in PCD table C 320. Build processing key value program instructions 308 may include one or more program instructions that specify a hard coded key definition 314 for PCD value C. The program instructions may include instructions for locating one or more data elements in business product transaction 302 and database 310. In this example, the program instructions have embedded references to data elements x and y. Data element x is located in business product transaction 302, and data element y is located in database 310. The values stored in the located data elements may be copied into one or more key elements in processing key value 316. Processing key value 316 may be stored in program memory in transaction processing program 300.

After the processing key value 316 is constructed in build process key value program instructions 308, transaction processing program may send a request 304 to PCD program 306. Request value from PDC C 304 may include information on which PCD table is to be searched. Request value from PDC C 304 may also include a processing key value to be searched for. In this example, request value from PDC C 304 includes information specifying that PCD table C 320 is to be searched, and includes processing key value 316. PCD program 306 receives request value from PDC C 304 and locates the requested PCD table 320. PCD program 306 may include program instructions 318 that are configured to search PCD table C 320 for a key value. The search of PCD table C 320 may include comparing processing key value 316 with a first key value in PCD table C 320. If processing key value 316 does not match the key value, the search may continue with the next key value in PCD table C 320. The search may continue until a key value in PCD table C 320 is found that matches processing key value 316, or until all of the key values in PCD table C 320 have been compared to processing key value 316 without finding a match.

If a matching key value for processing key value 316 is found, the PCD value 326 corresponding to the matching key value is returned to transaction processing program 300. In this example, processing key value 316 is the value [1, 2]. Searching PCD table C 320 finds key value [1, 2] in the first row of the table. The PCD value stored with key value [1, 2] is 5.0. The PCD value 5.0 is returned to transaction processing program 300 in PCD value 326.

If a matching key value for processing key value 316 is not found, PCD program 306 may notify transaction processing program 300 that a match for processing key value 316 was not found. Build process key value program instructions 308 may include one or more program instructions for creating an alternate processing key value (not shown) for PCD value C. The alternate processing key value may include alternate values for one or more of the key elements. The alternate processing key value may be sent to PCD program 306 in a request value from PDC C 304, and the searching of PCD table C 320 as described above may be repeated with the alternate processing key value.

Figure 3A:
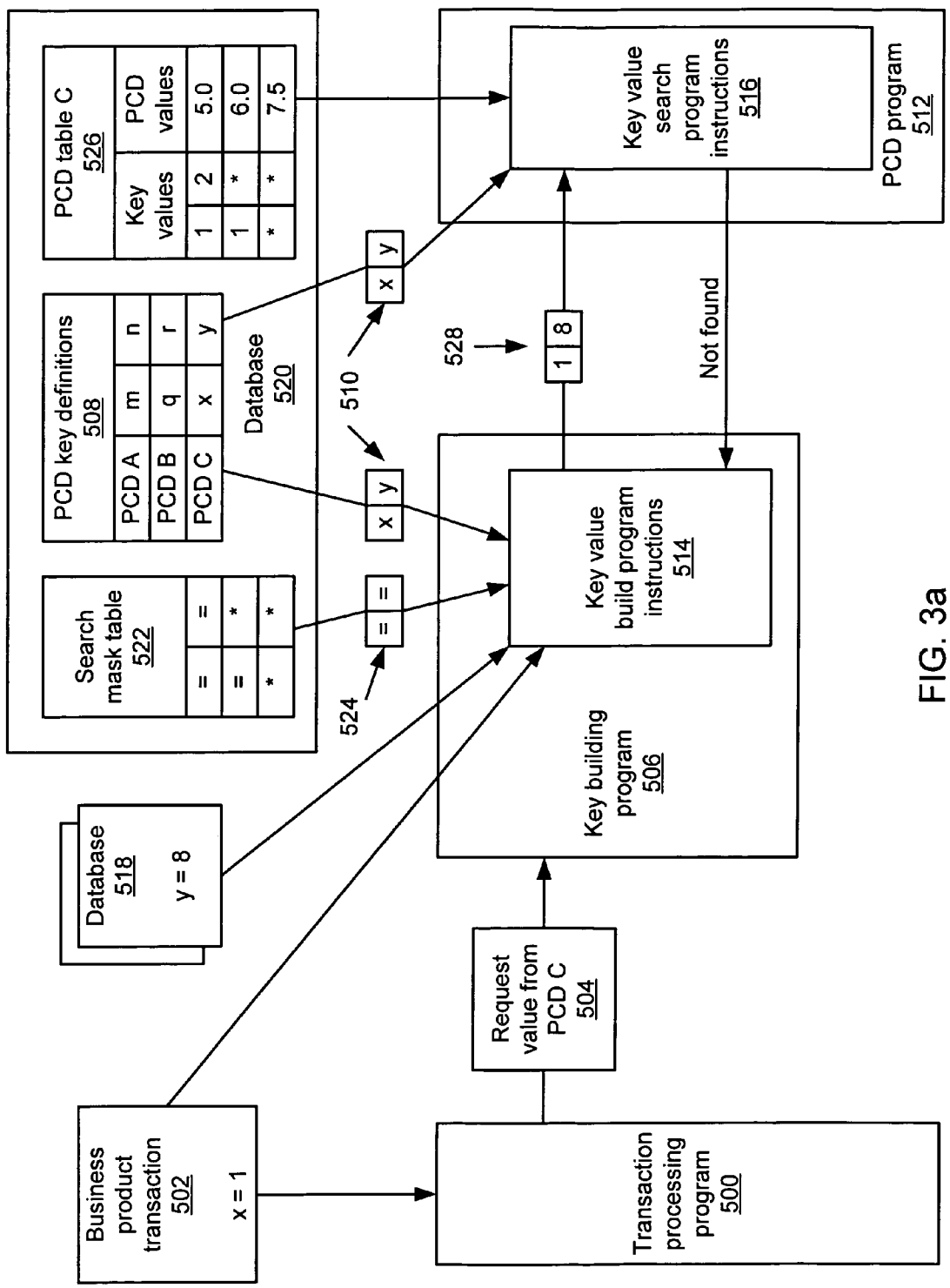
FIG. 3a illustrates one embodiment of a system for processing FSO business data using user-defined key definitions, search masks, key values and PCD values, illustrating an unsuccessful first search of a PCD table for a match to a processing key value.
Figure 3B:
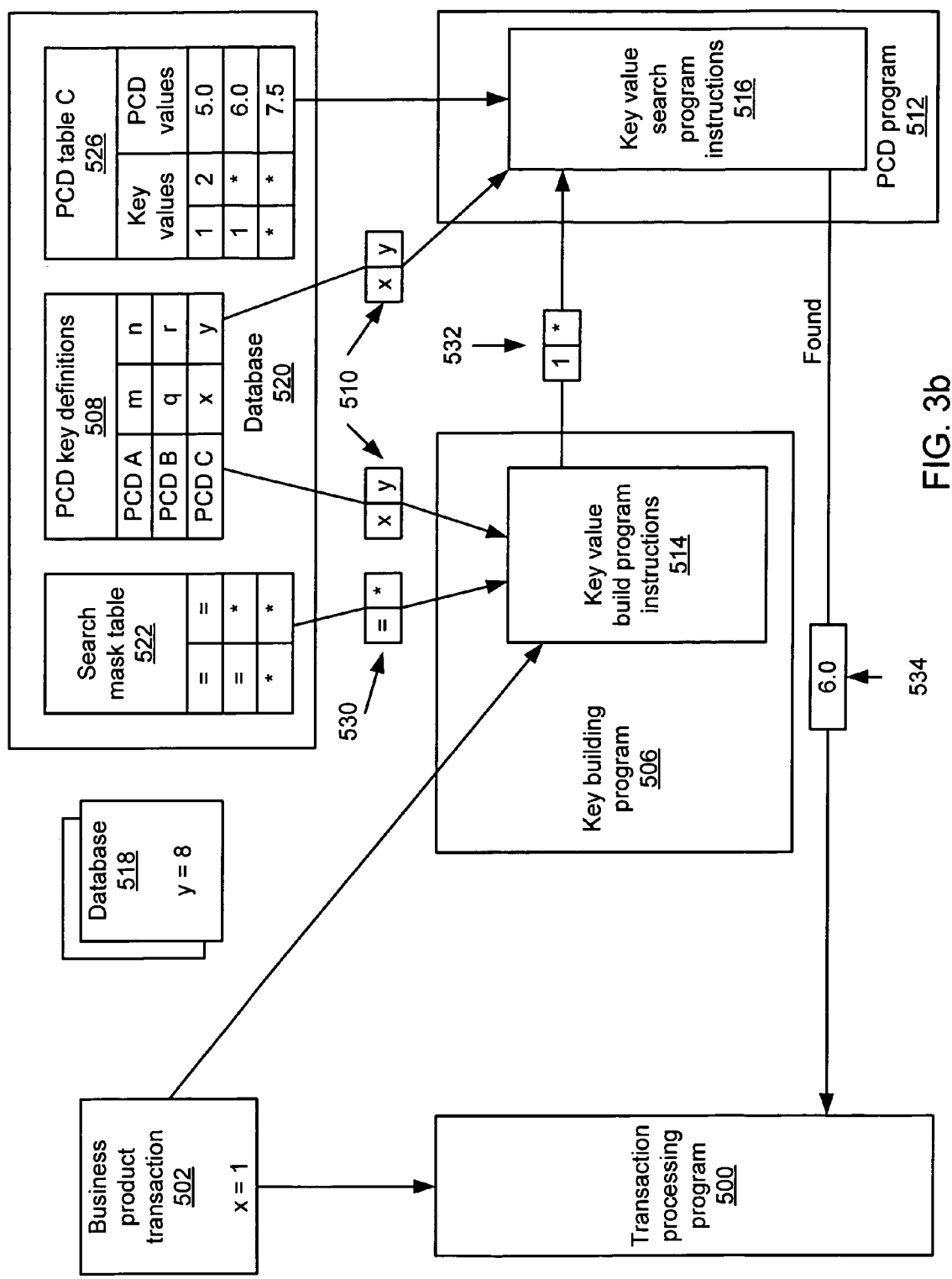
FIG. 3b illustrates one embodiment of a system for processing FSO business data using user-defined key definitions, search masks, key values and PCD values, illustrating a successful second search of a PCD table for a match to a processing key value.

FIG. 3a—One Embodiment of a System for Processing FSO Business Data Using User-Defined Key Definitions, Search Masks, Key Values and PCD Values, Illustrating an Unsuccessful First Search of a PCD Table for a Match to a Processing Key Value FIGS. 3a and 3b are block diagrams illustrating one embodiment of a system for processing FSO business data, and illustrates one embodiment of searching a PCD table for a match to a processing key value, where the key definitions, search masks, key values, and PCD values are all entered by a user of the system. In one embodiment, the user may identify the key definitions during the configuration of the FSO computer system. In one embodiment, an expert system may be programmed to identify the key definitions.

Referring to FIG. 3a, the system may include a transaction processing program 500, a key building program 506, and a PCD program 512. The system may also include a database 518, a PCD key definition table 508, a search mask table 522, and a PCD table C 526. In one embodiment, database 518 may include customer account master files. In one embodiment, PCD key definition table 508, search mask table 522, and PCD table C 526 may reside in a database 520.

Transaction processing program 500 may receive a business product transaction 502 for processing. Transaction processing program 500 may require a PCD value from PCD table C 526 for processing business product transaction 502. Transaction processing program may send a request value from PCD 504 to key building program 506. Request value from PCD 504 may include information identifying the PCD table that transaction processing program 500 requires a PCD value from. In this example, transaction processing program is requesting a PCD value from PCD table C.

Key building program 506 may include build key value program instructions 514 for building a key value. Build key value program instructions 514 may receive the PCD table name from request value from PCD 504. In this example, the PCD table name is PCD table C. Build key value program instructions 514 may search PCD key definition table 508 for a PCD key definition for PCD table C. PCD key definition 510 may be read from PCD key definition table 508 in response to finding the entry in the table for PCD table C. In this example, key definition 510 for PCD table C includes data elements x and y. Data element x is located in business product transaction 502, and data element y is located in database 518.

Build key value program instructions 514 may access search mask table 522 for PCD table C in database 520. In one embodiment of a search mask table, the search masks in the search mask table may be arranged in an order from first to last, wherein the search masks are read in order from first to last by a key building program until a match for a processing key value is located. After locating search mask table 522, build key value program instructions 514 may read a first search mask 524 from search mask table 522. In one embodiment of search mask tables, each row of the search mask includes one search mask, and each search mask includes one field for each key element in the key definition associated with the search mask table. In one embodiment, wildcard mask field values and equal mask field values may be entered as mask values in search mask fields. In one embodiment, an equal mask field value in a search mask field may specify that, when constructing or preparing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element. For example, key elements of numeric data type may use zero (0) as a low collating value, and character fields may use spaces, or blank characters, as low collating values. Other key element types may have low collating values specific to the type. In the embodiment illustrated in FIG. 3a, an equal mask field value is represented by an equal sign ("="), and a wildcard mask field value is represented by an asterisk ("*"). In this example, search mask 524 includes one search mask field for each data element in key definition 510, where the search mask fields for data elements x and y are set to equal mask field values.

Build key value program instructions 514 may use key definition 510 and search mask 524 to build a first key value 528 from data element values read from database 518 and business product transaction 502. Build key value program instructions 514 may use the data elements in key definition 510 to read the data element values from the data elements. In this example, the value read from data element x in transaction 502 is 1, and the value read from data element y in database 518 is 8. Build key value program instructions 514 may use search mask 524 to copy the data elements into processing key value 528. In this example, both search mask values in search mask 524 are equal search mask values, so the data element values may be copied directly into the key elements of processing key value 528. Processing key value 528 may be passed to PCD program 512. Information indicating which PCD table to search may also be passed to PCD program 512.

PCD program 512 may include key value search program instructions 516 configured for searching PCD tables and matching processing key values to PCD key values. In this example, the PCD table name is PCD table C. In one embodiment, key value search program instructions 516 may search PCD key definition table 508 for a PCD key definition for PCD table C. PCD key definition 510 may be read from PCD key definition table 508 in response to finding the entry in the table for PCD table C. In this example, key definition 510 for PCD table C includes data elements x and y. Data elements may include information on the format of data element values, such as the data type and length of the data. In one embodiment, key value search program instructions 516 may use the data format information of the data elements in a key definition during the comparison of a processing key values to one or more PCD table key values. In another embodiment, key value search program instructions 516 may compare a processing key value directly to a PCD table key value without using the formatting information from data elements in a key definition.

In one embodiment, key value search program instructions 516 may use information received from key building program 506 to locate PCD table C 526 in database 520. Key value search program instructions 516 may include instructions for searching the key value fields of a PCD table for a key value that matches a processing key value. In one embodiment, two key values match if they include the same key elements in the same order, and if the key element values in the first key value are the same as the key element values in the second key value for all of the key elements in the key element values. In the example shown in FIG. 3a, processing key value 528 includes the key element values [1, 8]. Key value search program instructions 516 may compare processing key value 528 to each of the key values in PCD table C 526. In this example, PCD table C 526 does not include a key value that matches processing key value 528. PCD program 512 may notify key building program 506 that no matching key value was found in PCD table C 526.

FIG. 3b-One Embodiment of a System for Processing FSO Business Data Using User-Defined Key Definitions Search Masks, Key Values and PCD Values, Illustrating a Successful Second Search of a PCD Table for a Match to a Processing Key Value FIGS. 3a and 3b are block diagrams illustrating one embodiment of a system for processing FSO business data, and illustrates one embodiment of searching a PCD table for a match to a processing key value, where the key definitions, search masks, key values, and PCD values are all entered by a user of the system. Referring to FIG. 3b, the system may include a transaction processing program 500, a key building program 506, and a PCD program 512. The system may also include a database 518, a PCD key definition table 508, a search mask table 522, and a PCD table C 526. In one embodiment, database 518 may include customer account master files. In one embodiment, PCD key definition table 508, search mask table 522, and PCD table C 526 may reside in a database 520.

FIG. 3b illustrates one embodiment of building a second processing key value and searching for a match to the second processing key value after no matching key value is found for a first processing key value in a PCD table. In FIG. 3a, PCD program 512 may notify key building program 506 that no match was found for processing key, value 528 in PCD table C 526. Referring to FIG. 3b, key building program 506 may include build key value program instructions 514 for building a key value. Build key value program instructions 514 may use key definition 510 and a second search mask 530 read from search mask table 522 to build a second key value 532 from data element values read from database 518 and business product transaction 502. Build key value program instructions 514 may use the data elements in key definition 510 to read the data element values from the data elements. In this example, the value read from data element x in business product transaction 502 is 1. Build key value program instructions 514 may use search mask 530 to copy the data elements into processing key value 532. In this example, the first search mask field value in search mask 530 is an equal search mask value, and therefore the data element value for data element x may be copied into the first key element of processing key value 532. The second search mask field value in this example is a wildcard search mask value, and therefore the wildcard value for the data type of data element y may be copied into the second key element of processing key value 532. After processing key value 532 is built by build key value program instructions 514, processing key value 532 may be passed to PCD program 512. Information indicating which PCD table to search may also be passed to PCD program 512.

PCD program 512 may include key search value program instructions 516 configured for searching PCD tables and matching processing key values to PCD key values. In this example, the PCD table name is PCD table C. In one embodiment, key search value program instructions 516 may use information received from key building program 506 to locate PCD table C 526 in database 520. Key search value program instructions 516 may include instructions for searching the key value fields of a PCD table for a key value that matches a processing key value. In the example shown in FIG. 3b, processing key value 532 includes the key element values [1,*], where "*" represents the wildcard, or low collating, value for the data element y in key definition 510. Key search value program instructions 516 may compare processing key value 532 to each of the key values in PCD table C 526. In this example, the search of PCD table C 526 finds a matching key value [1, *] in a row of the PCD table. Key search value program instructions 516 may read PCD value 534 from the row of the PCD table where the matching key value was found. PCD program 512 may then send PCD value 534 to transaction processing program 500.

Key building program 506 and PCD program 512 may continue to search PCD table C 526 for a match to a processing key value constructed from transaction and database data element values and wildcard values until a match is found or until all the search masks in search mask table 522 have been used without finding a matching PCD key value. In the example shown in FIG. 3b, a row in search mask table 522 has wildcard values for all of the data elements in key definition 510. There is also a row in PCD table C 526 where all of the key element values are set to wildcard values. Therefore, in this example, a match, and therefore a corresponding PCD value, will be found for all transactions. In other examples where one or both of the tables do not include a row with all wildcard values, a matching key value for a processing key value may not be found in a PCD table, and therefore no PCD value is found for the original request issued by transaction processing program 500. In one embodiment, transaction processing program 500 may be notified when a PCD value is not found by key building program 506 and PCD program 512.

Figure 4:
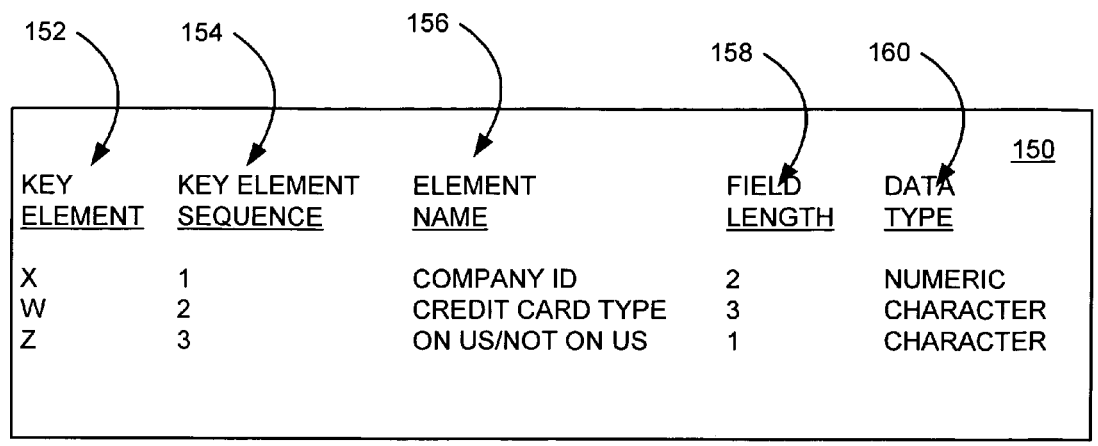
FIG. 4 illustrates one embodiment of a key definition with examples of fields that may be included in the key definition.

FIG. 4—One Embodiment of a Key Definition with Examples of Fields that May be Included in the Key Definition FIG. 4 illustrates an embodiment of a key definition that may have been defined by a user of an FSO system, with key elements displayed on a key definition screen 150. Each key element may include several parameters that define the key element. In one embodiment, the key elements may be displayed as rows on computer display screen 150, with the columns displaying key element parameters. This example shows key elements-X, W, and Z. Key element column 152 displays the key element name. Key element sequence column 154 displays the order in which the key elements will appear in the key definition. In this example, key element X is the first key element, key element W is the second key element, and key element Z is the third key element. Element Name column 156 may display a data element name. In this example, key element X is Company ID, key element W is the Credit Card Type, and key element Z is ON US/NOT ON US. Field Length column 158 may display a length in units for the key element. In one embodiment, the units are 8-bit bytes. In this example, key element X is 2 bytes long, key element W is 3 bytes long, and key element Z is one byte long. Data type column 160 may display a data type for the key element. In this example, key element X is of type numeric, and key elements W and Z are of type character.

Figure 5:
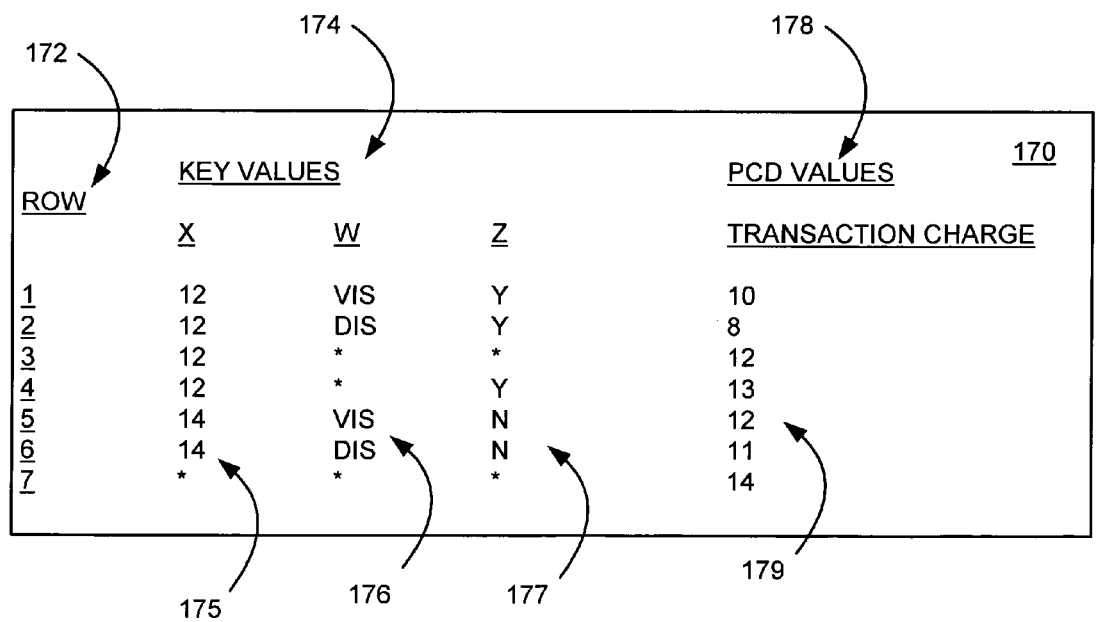
FIG. 5 illustrates one embodiment of a PCD table for the key definition of FIG. 4 with examples of key values and processing parameter values.

FIG. 5—One Embodiment of a PCD Table for the Key Definition of FIG. 4 with Examples of Key Values and Processing Parameter Values FIG. 5 illustrates an embodiment of a PCD table 170 from a database used in an FSO system, with rows including key values 174 and PCD values 178 associated with the key values. A PCD table may be used to store key values and the processing, or PCD, values associated with the key values. The key values and processing parameter values may be entered by a user of the FSO system. In one embodiment, a PCD table may include pre-defined key values and processing parameter values, and the user of the FSO system may add key values and processing parameter values to the PCD table.

A PCD table may be searched for a particular key value to find the processing parameter value associated with the key value. In this example, PCD table 170 may be used to access credit card merchant transaction charges 179 for different key values. In the credit card business, an Acquirer is an FSO that manages credit card accounts, processes credit card transactions, and collects credit card payments as an agent of one or more organizations, or companies. The FSO may charge a merchant transaction charge for each credit card transaction processed. The ability for a user of the FSO system to configure key definitions and PCD tables at configuration time allows the FSO to define merchant transaction charges for a particular transaction based upon attributes of the transaction. For example, a bank may manage the Visa and Discovery credit card transactions for Store 12 and Store 14. The user may include one or more attributes (data elements) of the transaction as key elements in the key definition, and may define one or more permutations of key values and associated merchant transaction prices for the permutations in the merchant transaction pricing PCD table. In this example, the bank may define different transaction prices for processing MasterCard transactions for Store 12 than it charges for processing MasterCard transactions for Store 14.

In one embodiment, each row 172 in table 170 holds one key value and its associated processing parameter value. In one embodiment, each key value is unique among the key values in the PCD table. Each key definition is associated with one PCD table. A key value may be constructed from the key element values stored in the one or more key elements defined in the key definition for this PCD table. In this example, the key values are constructed from key elements X (175), W (176), and Z (177), as defined in key description 150 illustrated in FIG. 4. In FIG. 5, row 1's key value is (12, VIS, Y). The processing parameter value corresponding to the key value of (12, VIS, Y) is 10. Searching PCD table 170 for the key value of (12, VIS, Y) will return the transaction charge of 10.

In one embodiment of PCD tables, wildcard values may also be entered as key element values in a PCD table. In FIG. 5, key elements with wildcard values are represented by asterisks ("*"). In one embodiment of PCD tables, low collating values for the data type of the key element may be used as wildcard key element values. For example, key elements of numeric data type may use zero (0) as a low collating value, and character fields may use spaces, or blank characters. Other key element types may have low collating values specific to the type. Any or all of the key element values in a row of a PCD table may be set to a wildcard value. In FIG. 5, row 3 has key elements W and Z set to wildcard values, row 4 has key element W set to a wildcard value, and row 7 has all of its key elements (X, W, and Z) set to wildcard values. In one embodiment, to specify a wildcard value for a key element value, the user may enter a wildcard display value (for example, "*") in the PCD table entry display screen, and the FSO system may then substitute the low collating value for the data type of the key element set to the wildcard display value when storing the key value in the PCD table.

FIG. 6—One Embodiment of a Search Mask Table with Examples of Search Masks that May be Applied to the PCD Table of FIG. 5

In one embodiment of an FSO system using PCD tables to store key values and associated processing parameter values, each PCD table and corresponding key definition may have an associated search mask table. A user of the FSO system may enter the search masks in the search mask table. A search mask table may include one or more rows for storing search masks entered by the user, with each row including one column, or mask field, for each of the key elements in the key definition. In the example illustrated in FIG. 6, search mask table 180 may be defined for key definition 150 illustrated in FIG. 4 and PCD table 170 illustrated in FIG. 5. Thus, search mask table 180 may include mask fields corresponding to key elements X, W, and Z in key definition 150. The user of the FSO system may enter a mask field value for each mask field in each search mask in a search mask table.

In one embodiment of a search mask table, mask field values may include an equal mask field values and a wildcard mask field value. In one embodiment, an equal mask field value may be entered by the user and displayed on the search mask entry display screen as an equal sign ("="), as illustrated in FIG. 6. In one embodiment, a wildcard mask field value may be entered by the user and displayed on the search mask entry display screen as an asterisk ("*"), as illustrated in FIG. 6. In one embodiment, an equal mask field value in a mask field may specify that, when constructing a processing key value from the data element values in a customer account data set during processing of the customer account data set, the key element value in the processing key value corresponding to the mask field will be set to the data element value from the customer account data set. In one embodiment, a wildcard mask field value in a mask field may specify that, when constructing a processing key value from the data element values in a customer account data set during processing of the customer account data set, the key element value in the processing key value corresponding to the mask field will be set to the low collating value for the data type of the key element.

One embodiment of a PCD table search process in an FSO system may use the search masks in a search mask table to construct processing key values from a customer account data set. In one embodiment, the search process may start at the first search mask in the search mask table, build a processing key value from the customer account data set using the first search mask, and search the PCD table for a key value that matches the processing key value. If a matching key value is found, the search process may return the processing parameter value for the key value to a program that requested the processing parameter value for the customer account data set. If a matching key value is not found, the search process go to the second search mask in the search mask table, build a processing key value from the customer account data set using the second search mask, and search the PCD table for a key value that matches the processing key value. The search process may iterate through the search masks in the search mask table until a matching key value is found or until there are no more search masks. When no matching key value is found and all search masks have been used, a message may be returned to the requesting program that no processing parameter value exists for the customer account data set.

Search mask table 180 illustrated in FIG. 6 includes four search masks 183 that may be used with key definition 150 illustrated in FIG. 4 to construct a processing key value from a customer account data set during a search of PCD table 170 illustrated in FIG. 5. In FIG. 6, the search masks are in a search order 184 from search mask 1 to search mask 4. In search mask 1, mask fields X, W, and Z are all assigned equal mask field values, represented by an equal sign ("="). Search mask 2 has mask fields X and Z assigned equal mask field values, and mask field W assigned a wildcard mask field value represented by an asterisk ("*"). Search mask 3 has mask field X assigned an equal mask field value and mask fields W and Z assigned wildcard mask field values. Finally, in search mask 4, mask fields X, W and Z are all assigned wildcard mask field values.

Search mask table 180 illustrated in FIG. 6 includes a search mask where all of the mask fields are set to the equal mask field value, and also includes a search mask where all of the mask fields are set to the wildcard mask field value.

In one embodiment, search mask tables may not be required to include search masks where all mask fields are set to equal mask field values. In one embodiment, search mask tables may not be required to include search masks where all mask fields are set to wildcard mask field values.

FIG. 7—One Embodiment of a Structure for a Database Table for Storing Key Definitions FIG. 7 illustrates one embodiment of a database table that may be used to store key definitions defined by a user in an FSO system. Key definition table 200 may include PCD table identifiers 202 and user-defined key definitions 204. In one embodiment of an FSO system using user-defined key definitions, there is one key definition table 200 in an FSO system database. In one embodiment of an FSO system using user-defined key definitions, there is one row in key definition table 200 for each PCD table in the FSO system database, with each row including one PCD table identifier 202 that references the PCD table and one key definition 204 that defines the key format for the PCD table.

In an FSO system, key definition table 200 may be used during configuration of the FSO system to store key definitions 204 defined by a user of the system. Key definition table 200 may also be used during configuration to present a display screen to the user of the FSO system for defining key values and their associated processing parameter values in a PCD table. Key definition table 200 may also be used during configuration to format the key values defined by the user as the key values are stored in the key value fields of the PCD table. Key definition table 200 may also be used during configuration to present a display screen to the user for defining search masks for key definitions, and to format the search masks defined by the user as they are stored in a search mask table.

In an FSO system, the user-defined key definitions 204 in key definition table 200 may be used during the processing of FSO business data, including the processing of customer account data sets. A computer program running on the FSO system may request a processing parameter value from a PCD table during the processing of a customer account data set. In response to the request, the user-defined key definition 204 for the PCD table may be read from key definition table 200 and used with a user-defined search mask for the key definition to construct a processing key value from the customer account data set. The processing key value may be used to search the PCD table for the PCD key value that matches the processing key constructed from the customer account data set. If a matching PCD key value is found, the processing parameter value for the matching PCD key value is returned to the calling program.

FIG. 8—One Embodiment of a Database Structure for Referencing Search Masks

FIG. 8 illustrates one embodiment of a database structure that may be used to store and reference search masks defined by a user in an FSO system. A table 205 may include PCD table identifiers 206 and references to search mask tables 208. In one embodiment of an FSO system using user-defined key definitions and search masks, there is one table 205 in an FSO system database. In one embodiment of an FSO system using user-defined key definitions and search masks, there is one row in table 205 for each PCD table in the FSO system database, with each row including one PCD table identifier 206 that references the PCD table and one reference to a search mask table 204. In another embodiment of table 205, all of the search mask tables may be merged into table 205, with one row in table 205 for each search mask for each PCD table.

In an FSO system, the search mask tables 208 in table 205 may be used during the processing of FSO business data, including the processing of customer account data sets. A computer program running on the FSO system may request a processing parameter value from a PCD table during the processing of a customer account data set. In response to the request, the user-defined key definition for the PCD table may be read from a key definition table. A first user-defined search mask may be read from search mask table 208 for the PCD table and may be used with the key definition to construct a first processing key value from the customer account data set. The first processing key value may be used to search the PCD table for a PCD key value that matches the first processing key value constructed from the customer account data set. If a matching PCD key value is found, the processing parameter value for the matching PCD key value is returned to the calling program. If a matching PCD key value is not found, a second user-defined search mask may be read from search mask table 208 and used with the key definition to construct a second processing key value. The second processing key value may be used to search the PCD table for a PCD key value that matches the second processing key value. The process of reading a next search mask, building a processing key, and searching the PCD table may continue until a matching PCD key value is found or until all search masks have been used and no matching PCD key value is found.

Figure 9:
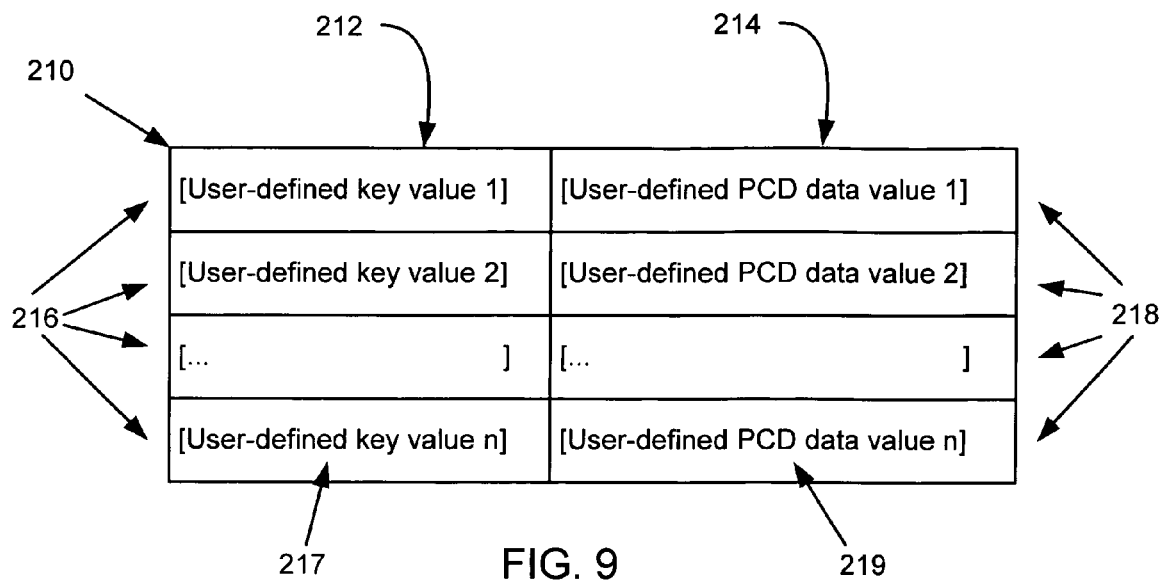
FIG. 9 illustrates one embodiment of a structure for a user-defined PCD table with key values and data values.

FIG. 9—One Embodiment of a Structure for a User-Defined PCD Table with Key Values and Data Values FIG. 9 illustrates one embodiment of a PCD table for storing key values and associated PCD data values defined by a user of the FSO system using a process as illustrated in FIG. 5. Referring to FIG. 9, PCD table 210 may include cells 216 for storing user-defined key values 217 in one column 212 and cells 218 for storing user-defined PCD data values 219 in a second column 214. One row in the table may include one cell 216 for storing a user-defined key value 217 and one cell 218 for storing the user-defined PCD data value 219 associated with the key value. In this example, user-defined key values (1, 2, . . . , n) correlate to user-defined processing parameter values (1, 2, . . . , n). A user-defined key value 217 may include one or more key value fields. A user-defined PCD data value 219 may include one or more processing parameter values.

Figure 10:
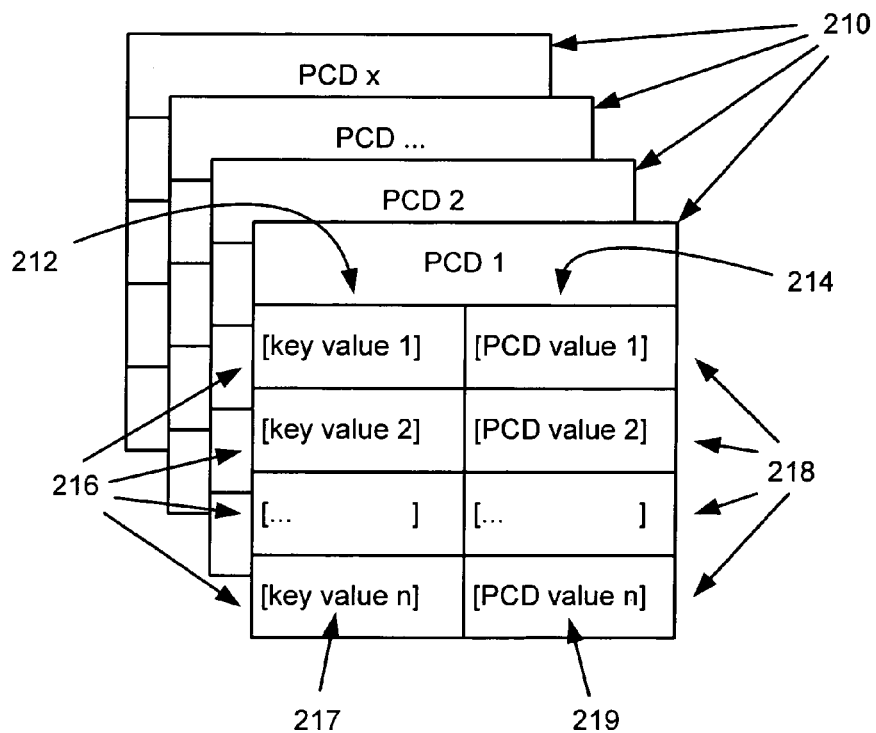
FIG. 10 illustrates one embodiment of several PCD tables in an FSO system.

FIG. 10—One Embodiment of Several PCD Tables in an FSO System

FIG. 10 illustrates one embodiment of a plurality of PCD tables 210 in an FSO system database. PCD tables 210 may include cells 216 for storing user-defined key values 217 in one column 212 and cells 218 for storing user-defined PCD data values 219 in a second column 214. One row in each table may include one cell 216 for storing a user-defined key value 217 and one cell 218 for storing the user-defined PCD data value 219 associated with the key value. In this example, in PCD table 1, key values (1, 2, . . . , n) correlate to processing parameters (1, 2, . . . , n). A user-defined key value 217 may include one or more key value fields. A user-defined PCD data value 219 may include one or more processing parameter values.

In one embodiment, cells 216 for storing key values 217 may be of a pre-configured fixed size that is identical for all PCD tables 210. In this embodiment, the fixed size of cells 216 may be pre-configured large enough to store key values 217 of the maximum size anticipated by the user of the system. In one embodiment, if the pre-configured size of cells 216 is not large enough, the PCD tables may be re-configured with a larger fixed size for cells 216.

PCD tables (1, 2, . . . , x) as illustrated in FIG. 10 may be used in an embodiment of a production FSO system to store user-defined processing parameter values and their associated user-defined key values. A program running on the FSO system may require a particular processing parameter value to process a customer account data set. The FSO system may determine which PCD table contains the processing parameter value, use the key definition and search mask table for the PCD table to construct a processing key value, and use the processing key value to search the PCD table key values for a matching key value. The matching key value is stored with the particular processing parameter value best suited for processing of the customer account data set.

FIG. 11—Examples of Inputs to and Results from One Embodiment of a Search Process that May be Applied to PCD Tables as Depicted in FIG. 5 Using Search Mask Tables Such as the Search Mask Table Depicted in FIG. 6

FIG. 11 illustrates several examples of processing key value inputs to, and processing parameter outputs from, one embodiment of a PCD table search process as applied to PCD table 170 illustrated in FIG. 5, using key definition 150 illustrated in FIG. 4 and search mask table 180 illustrated in FIG. 6 to construct the processing key values. A PCD table search process may be initiated in response to a request for a processing parameter for use in processing a customer account data set in an FSO system.

In search 1, the PCD table search process uses key definition 150 and the first search mask in search mask table 180 to construct processing key values 193 for a first customer account data set. In the first search mask, all mask values are set to the equal mask field value. A first processing key value is constructed using the first search mask. Key element X is set to the value 12 read from the customer account data set, key element W is set to the value DIS read from the customer account data set, and key element Z is set to the value Y read from the customer account data set. PCD table 170 is searched for the key value (12, DIS, Y). The key value for the second row in PCD table. 170 (as reflected by the numeral 2 in PCD Table Row column 194) matches the first processing key value. The search is completed when the match is found, and the corresponding transaction charge 195 (or other processing parameter), in this case a value of 8, is returned to the requesting process in the FSO system.

In search 2, the PCD table search process uses key definition 150 and the first search mask in search mask table 180 to construct processing key values 193 for a second customer account data set. A first processing key value is constructed using the first search mask. Key element X is set to the value 12 read from the customer account data set, key element W is set to the value MSC read from the customer account data set, and key element Z is set to the value Y read from the customer account data set. PCD table 170 is searched for the key value (12, MSC, Y). No exact match for the key value is found in PCD table 170. A second processing key value is constructed using the second search mask. Key element X is set to the value 12 read from the customer account data set, key element W is set to the wildcard key element value, and key element Z is set to the value Y read from the customer account data set. PCD table 170 is searched for the key value (12, *, Y). The key value for the fourth row in PCD table 170 (as reflected by the numeral 4 in PCD Table Row column 194) matches the second processing key value. The search is completed when the match is found, and the corresponding transaction charge 195, 13, is returned to the requesting process in the FSO system.

In search 3, the PCD table search process uses key definition 150 and the first search mask in search mask table 180 to construct processing key values 193 for a third customer account data set. A first processing key value is constructed using the first search mask. Key element X is set to the value 12 read from the customer account data set, key element W is set to the value MSC read from the customer account data set, and key element Z is set to the value N read from the customer account data set. PCD table. 170 is searched for the key value (12, MSC, N). No exact match for the key value is found in PCD table 170. A second processing key value is constructed using the second search mask. Key element X is set to the value 12 read from the customer account data set, key element W is set to the wildcard key element value, and key element Z is set to the value N read from the customer account data set. PCD table 170 is searched for the key value (12, *, N). Again, no exact match for the key value is found in PCD table 170. A third processing key value is constructed using the third search mask. Key element X is set to the value 12 read from the customer account data set, key element W is set to the wildcard key element value, and key element Z is set to the wildcard key element value. PCD table 170 is searched for the key value (12, *, *). The key value for the third row in PCD table 170 matches the third processing key value. The search is completed when the match is found, and the corresponding transaction charge 195, 12, is returned to the requesting process in the FSO system.

In search 4, the PCD table search process uses key definition 150 and the first search mask in search mask table 180 to construct processing key values 193 for a fourth customer account data set. A first processing key value is constructed using the first search mask. Key element X is set to the value 14 read from the customer account data set, key element W is set to the value MSC read from the customer account data set, and key element Z is set to the value N read from the customer account data set. PCD table 170 is searched for the key value (14, MSC, N). No exact match for the key value is found in PCD table 170. A second processing key value is constructed using the second search mask. Key element X is set to the value 14 read from the customer account data set, key element W is set to the wildcard key element value, and key element Z is set to the value N read from the customer account data set. PCD table 170 is searched for the key value (14, *, N). Again, no exact match for the key value is found in PCD table 170. A third processing key value is constructed using the third search mask. Key element X is set to the value 14 read from the customer account data set, key element W is set to the wildcard key element value, and key element Z is set to the wildcard key element value. PCD table 170 is searched for the key value (14, *, *). Again, no exact match for the key value is found in PCD table 170. A fourth processing key value is constructed using the fourth search mask. Key element X is set to the wildcard key element value, key element W is set to the wildcard key element value, and key element Z is set to the wildcard key element value. PCD table 170 is searched for the key value (*, *, *). The key value for the seventh row in PCD table 170 is set to all wildcard values, and thus matches the fourth processing key value. The search is completed when the match is found, and the corresponding transaction charge 195, 14, is returned to the requesting process in the FSO system.

Figure 12A:
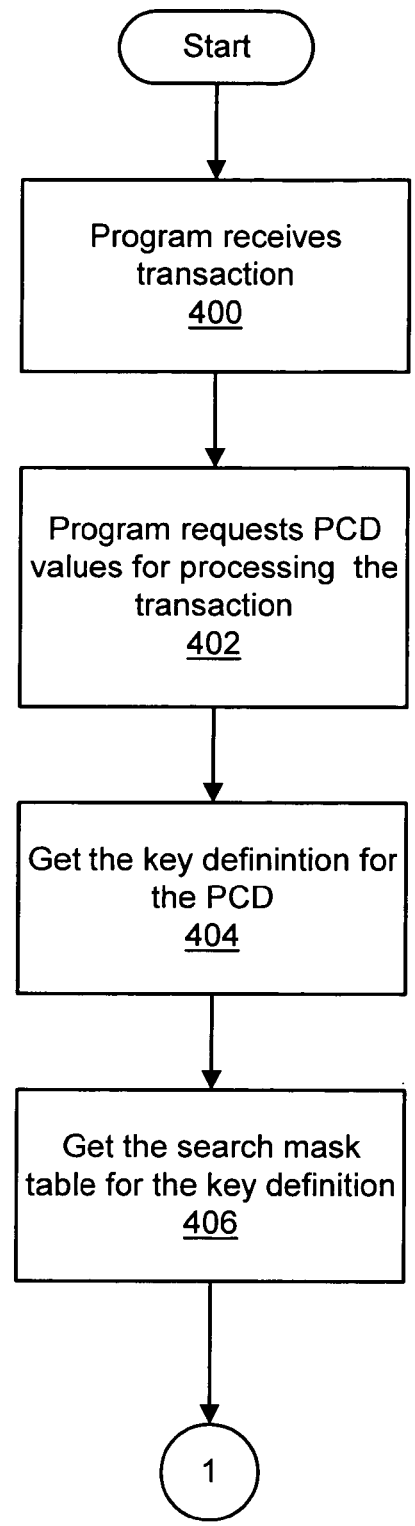
FIG. 12a is a flow diagram illustrating one embodiment of a process for processing business data in an FSO computer system using user-configured key definitions, search masks, key values and processing values.

FIG. 12a—A Flow Diagram Illustrating One Embodiment of a Process for Processing Business Data in an FSO Computer System Using User-Configured Key Definitions, Search Masks, Key Values and Processing Values FIG. 12a is a flowchart illustrating one embodiment of a process using user-configured key definitions, search masks, key values and processing values to perform processing on business data in an FSO computer system. In one embodiment, steps 400 and 402 may be performed in a business transaction processing program in the FSO system. In step 400, a computer program in the FSO computer system may receive an FSO business transaction for processing. The transaction may be related to an account of a customer of the FSO. For example, the transaction may be a record of a credit card purchase made by a customer of the FSO at a client business of the FSO; the credit card used in the purchase may have been issued by the FSO. In step 402, the computer program may require one or more processing parameter values, or PCD values, to perform processing on the transaction. For example, the computer program may require a merchant transaction price for a credit card transaction originating at a client business of the FSO. In one embodiment, one or more PCD values may be stored in a PCD table. For example, the FSO system may include a merchant transaction price PCD table. The merchant transaction price PCD table may include multiple rows. Each row may include one merchant transaction price value and a key value useable to identify and locate the merchant transaction price value. In one embodiment, each key value in a PCD table is unique. One row in the table may include one PCD value, or a set of related PCD values, and a key value used to locate the PCD value. The computer program may generate a request for the required PCD value. In one embodiment, the request may be forwarded to a key building program in the FSO computer system.

In one embodiment, steps 404 and 406 in FIG. 12a may be performed by a key building program. In step 404, a key definition for the key values in the PCD table for the requested PCD value may be read by the key building program. In one embodiment, the key definition may be read from a key definition table in the FSO system. In step 406, the key building program may locate the search mask table for the key definition.

Figure 12B:
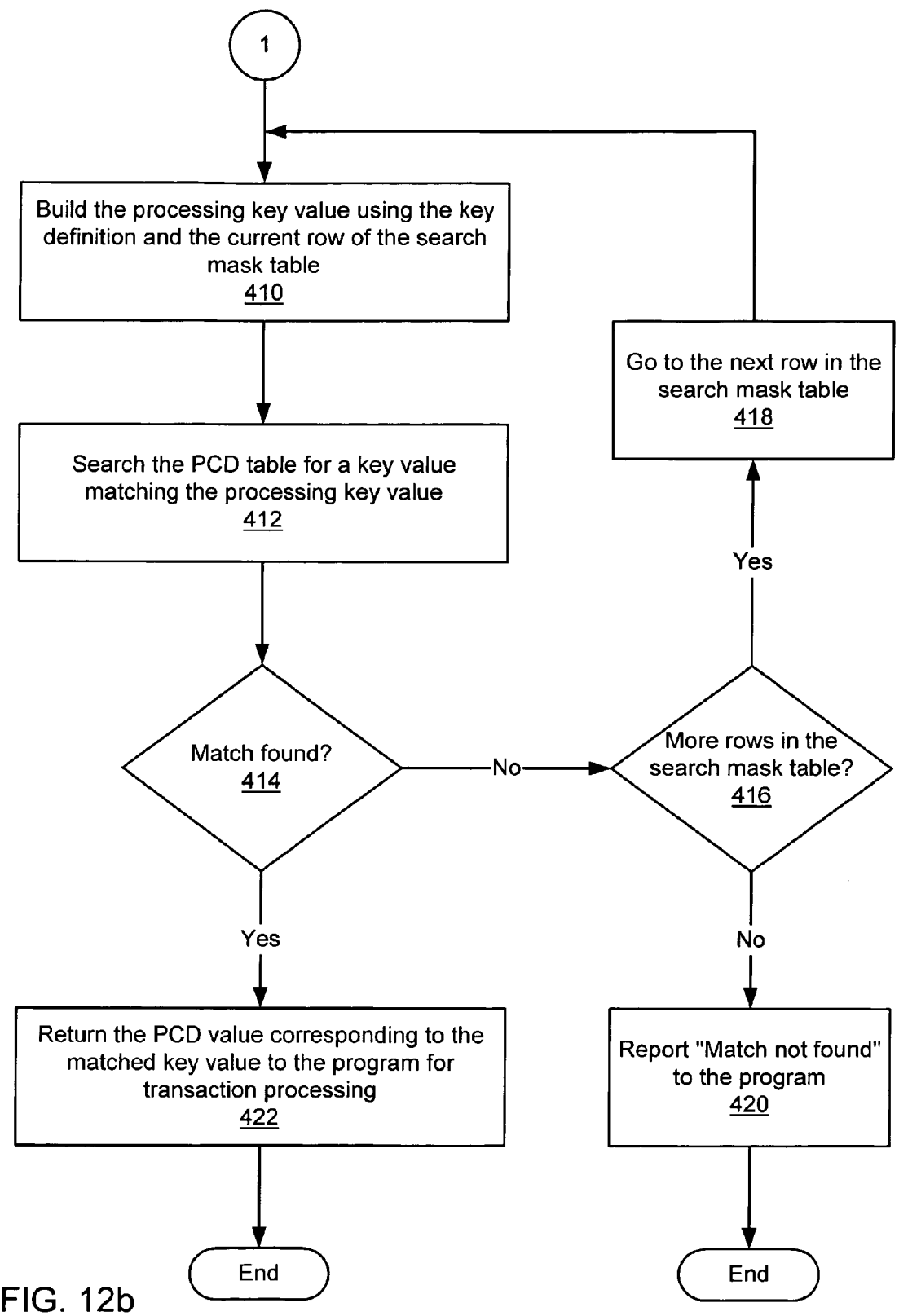

FIG. 12b—A Continuation of the Flow Diagram of FIG. 12a

FIG. 12b is a continuation of the flowchart begun in FIG. 12a, and illustrates one embodiment of a process that uses user-configured key definitions, search masks, key values and processing values to perform processing on business data in an FSO computer system. In one embodiment, steps 410, 416, 418 and 420 in FIG. 12b may be performed by the key building program that performed steps 404 and 406 in FIG. 12a. In one embodiment, steps 412, 414, and 422 may be performed by a PCD program configured to locate PCD tables and search PCD tables for matching key values.

Referring to FIG. 12b, a processing key value may be constructed using the key definition read in step 404 of FIG. 12a and a first search mask from the search mask table read in step 406 of FIG. 12a. Referring to step 410 of FIG. 12b, the key definition may include one or more data elements, where each data element includes information describing the location, type and format of data element values. Data element values may be located in the data set for the transaction being processed, or in database files associated with the transaction in one or more databases in the FSO system. The search mask read from the search mask table may include one search mask field for each of the data elements in the key definition. Each search mask field in the search mask may be set to a search mask field value. In one embodiment, search mask field values may include wildcard mask field values and equal mask field values. In one embodiment, an equal mask field value in a search mask field may specify that, when constructing a processing key value from data element values in the transaction data set and related databases, the key element value in the processing key value corresponding to the mask field may be set to the data element value. In one embodiment, a wildcard mask field value in a mask field may specify that the key element value in the processing key value corresponding to the mask field may be set to the low collating value for the data type of the corresponding data element in the key definition.

Continuing with step 410, each data element in the key definition may have a corresponding field in the search mask and in the processing key value. Each data element may also include information for locating and formatting a data element value in the transaction data or other database in the FSO system. Starting with a first data element from the key definition, the corresponding search mask field may be examined. If the search mask field value is an equal search mask field value, the data element value may be read from the location in the transaction data or other database in the FSO system and written to the corresponding processing key element value. If the search mask field value is a wildcard search mask field value, the low collating value for the data element may be written to the corresponding processing key element value. This process may be repeated for each key element in the key definition. When all processing key value fields have been assigned values, the processing key value is complete. In one embodiment, the processing key value is then passed to a PCD program.

In step 412, the PCD table may be searched for an occurrence of the processing key value constructed in step 410. In one embodiment, the PCD table may include one row for each combination of key value and PCD value. In one embodiment, each key value in the PCD table is unique among the key values in the PCD table. The key values in the PCD table may include one key element for each data element in the key definition associated with the PCD table. Each key element in the key value is set to a key element value. The format of the key value and key elements may be the same as the processing key value constructed in step 410. In step 412, each key value in the PCD table may be compared to the processing key value. Comparing the processing key value to a key value may include comparing each processing key element value to each corresponding key field value. In one embodiment, one or more key element values in the key value may be set to low collating values for the data element type for the key element. Key values may be compared to the processing key value until a key value that matches the processing key value is found, or until all of the key values have been compared without finding a match.

In step 414, if no matching key value was found for the processing key value in the PCD table, the search process may continue with step 416. In step 416, the search mask table is examined to see if there is another search mask. If there is another search mask, the process may go to the next search mask table row in step 418 and repeats steps 410, 412, and 414. If there are no more rows in the search mask table, the business transaction processing program that requested the PCD value in step 402 of FIG. 12a may be notified that no PCD value has been found for the transaction.

If a matching key value is found for the processing key value in the PCD table in the processing loop described by steps 410, 412, 414, 416, and 418, the processing loop may exit from step 414 to step 422. In step 422, the PCD value associated with the matched key value from the PCD table may be returned to the business transaction processing program that requested the PCD value for the transaction in step 402.

Figure 13:
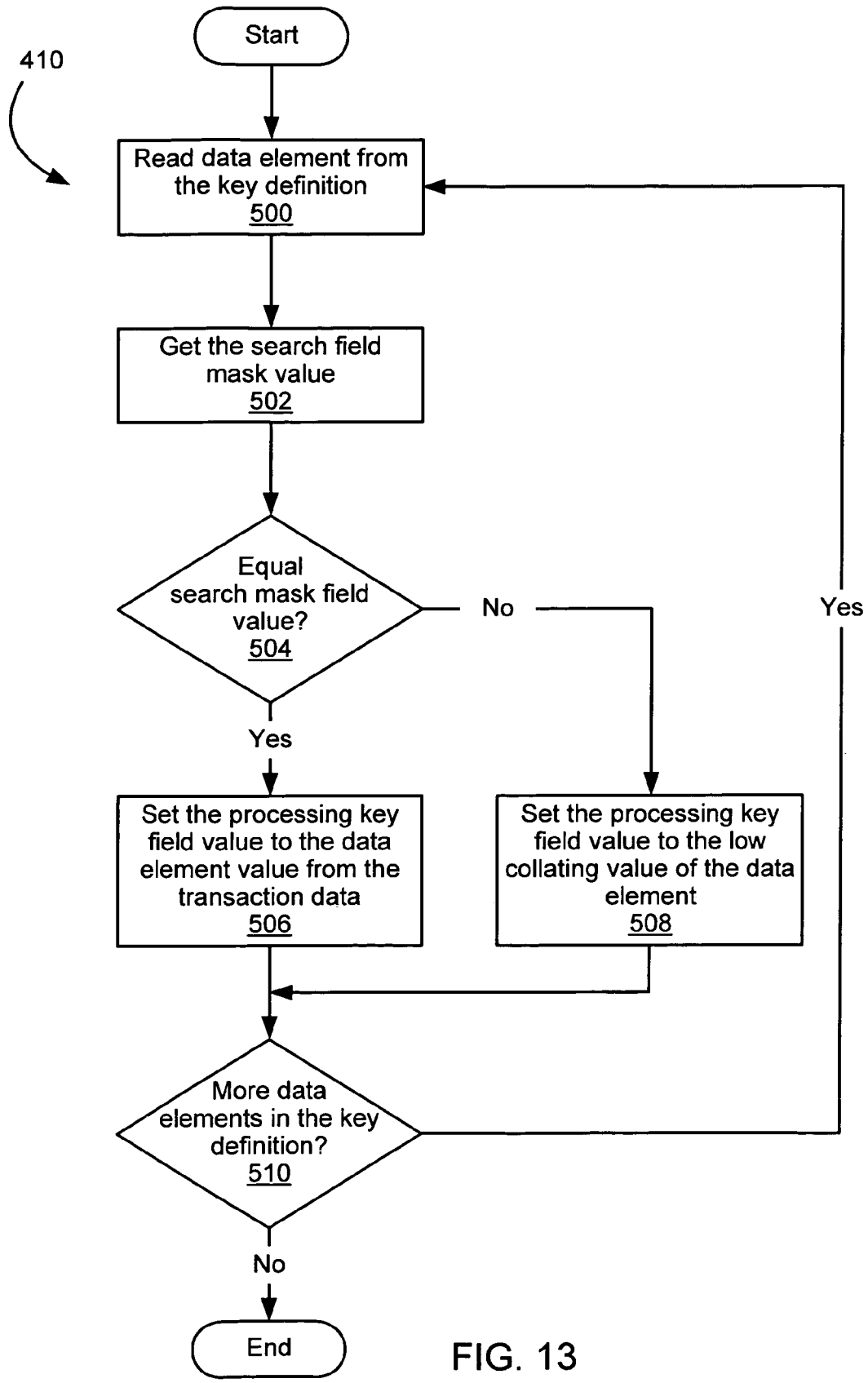
FIG. 13 is a flow diagram illustrating one embodiment of a process for building a key value from data element values using a search mask.

FIG. 13—A Flow Diagram Illustrating One Embodiment of a Process for Building a Processing Key Value from Data Element Values Using a Search Mask FIG. 13 is a flow diagram illustrating one embodiment of a process for building a processing key value from data element values using a search mask. FIG. 13 is a detailed flow diagram expanding on step 410 from FIG. 12*b*. Referring to FIG. 13, a data element may be read from the key definition in step 500. In step 504, a search mask field value may be read from the search mask field corresponding to the data element in the key definition. In step 502, the search mask field value may be examined. If the search mask field value is an equal search mask field value, the processing key field value corresponding to the current data element may be set to a data element value in step 506. The data element value may be read from transaction data or a database in the FSO system using location and formatting information from the data element. If the search mask field value is a wildcard search mask field value (therefore, not an equal search mask field value), the processing key field value corresponding to the current data element may be set to a low collating value for the data type of the data element in step 508. After the search mask field value has been set, step 510 may check to see if there are more data elements in the key definition. If there are more data elements in the key definition, processing may return to step 500. Another data element may be read from the key definition.

Various embodiments further include receiving or storing instructions and/or data implemented in accordance with the foregoing description upon a carrier medium. Suitable carrier media include memory media or storage media such as magnetic or optical media, e.g., disk or CD-ROM, as well as signals such as electrical, electromagnetic, or digital signals, conveyed via a communication medium such as networks and/or a wireless link.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method performed in a Financial Service Organization (FSO) computer system, the method comprising:
    configuring one or more processing parameter values for use in processing transaction-related data in the FSO computer system;
    reading a key definition from a database in response to receiving a request for a processing parameter from a first program, the key definition comprising the identity of one or more data element values in a set of transaction-related data;
    selecting a search mask table that corresponds to the key definition, the selected search mask table comprising one or more search masks;
    reading a first search mask from the selected search mask table, the first search mask comprising one or more search mask fields, each of the one or more search mask fields corresponding to one of the one or more data element values identified in the key definition, and each of the one or more search mask fields comprising a search mask field value;
    transferring one of the one or more data element values read from the transaction-related data to a first processing key value in response to the search mask field value indicating that the data element value from the transaction-related data is to be written to the processing key value;
    setting the first processing key value to a wildcard value if the search mask field value comprises a wildcard search mask field value;
    comparing the first processing key value to one or more key values in the database;
    if a match is found between the first processing key value and one of the one or more key values stored in the database, reading from the database a processing parameter value associated with the matching key value;
    if a match is not found between the first processing key value and one of the one or more key values stored in the database:
        creating one or more additional processing key values, the one or more additional processing key values being formed using one or more additional search masks obtained from the selected search mask table;
        comparing the one or more additional processing key values to one or more key values in the database until a match is found between at least one of the one or more additional processing key values; and
        reading from the database a processing parameter value associated with the matching key value;
    sending the processing parameter value associated with the matching key value in the database to the first program.

2. The method of claim 1, wherein the one or more key values in the database are defined by the user of the FSO computer system during the configuration of the FSO computer system, wherein the configuration of the FSO computer system occurs when a software program on the FSO computer system is initially set up for processing FSO transactions.

3. The method of claim 1, wherein the database further comprises a plurality of processing parameter tables, wherein each processing parameter table comprises one or more rows, wherein each row in the processing parameter table comprises one processing parameter value and one key value.

4. The method of claim 3, wherein the key definition is one of a plurality of key definitions in the database, wherein each of the plurality of key definitions in the database is associated with one of the plurality of processing parameter tables in the database.

5. The method of claim 4, wherein the plurality of key definitions are stored in one or more key definition tables, each key definition table being associated with one or more of the plurality of processing parameter tables, wherein reading the key definition from the database comprises reading the key definition from one of the key definition tables.

6. A computer system for processing Financial Service Organization (FSO) transactions, the system comprising:
a computer program;
a Financial Service Organization (FSO) computer system;
wherein the computer program is executable on the computer system to execute:
configuring one or more processing parameter values for use in processing transaction-related data in the FSO computer system;
reading a key definition from a database in response to receiving a request for a processing parameter from a first program, the key definition comprising the identity of one or more data element values in a set of transaction-related data;
selecting a search mask table that corresponds to the key definition, the selected search mask table comprising one or more search masks;
reading a first search mask from the selected search mask table, the first search mask comprising one or more search mask fields, each of the one or more search mask fields corresponding to one of the one or more data element values identified in the key definition, and each of the one or more search mask fields comprising a search mask field value;
transferring one of the one or more data element values read from the transaction-related data to a first processing key value in response to the search mask field value indicating that the data element value from the transaction-related data is to be written to the processing key value;
setting the first processing key value to a wild card value if the search mask field value comprises a wildcard search mask field value;
comparing the first processing key value to one or more key values in the database;
if a match is found between the first processing key value and one of the one or more key values stored in the database, reading a processing parameter value from the database in response to finding a match between the first processing key value and one of the one or more key values stored in the database;
if a match is not found between the first processing key value and one of the one or more key values stored in the database:
creating one or more additional processing key values, the one or more additional processing key values being formed using one or more additional search masks obtained from the selected search mask table;
comparing the one or more additional processing key values to one or more key values in the database until a match is found between at least one of the one or more additional processing key values; and
reading from the database a processing parameter value associated with the matching key value;
sending the processing parameter value associated with the matching key value in the database to the first program.

7. The system of claim 6, wherein the one or more key values in the database are defined by the user of the FSO computer system during the configuration of the FSO computer system, wherein the configuration of the FSO computer system occurs when a software program on the FSO computer system is initially set up for processing FSO transactions.

8. The system of claim 6, wherein the database further comprises a plurality of processing parameter tables, wherein each processing parameter table comprises one or more rows, wherein each row in the processing parameter table comprises one processing parameter value and one key value.

9. The system of claim 8, wherein the key definition is one of a plurality of key definitions in the database, wherein each of the plurality of key definitions in the database is associated with one of the plurality of processing parameter tables in the database.

10. The system of claim 9, wherein the plurality of key definitions are stored in one or more key definition tables, each key definition table being associated with one or more of the plurality of processing parameter tables, wherein reading the key definition from the database comprises reading the key definition from one of the key definition tables.

11. A computer readable medium comprising program instructions, wherein the program instructions are executable by a Financial Service Organization (FSO) computer system to implement:
configuring one or more processing parameter values for use in processing transaction-related data in the FSO computer system
reading a key definition from a database in response to receiving a request for a processing parameter from a first program, the key definition comprising the identity of one or more data element values in a set of transaction-related data;
selecting a search mask table that corresponds to the key definition, the selected search mask table comprising one or more search masks;
reading a first search mask from the selected search mask table, the first search mask comprising one or more search mask fields, each of the one or more search mask fields corresponding to one of the one or more data element values identified in the key definition, and each of the one or more search mask fields comprising a search mask field value;
transferring one of the one or more data element values read from the transaction-related data to a first processing key value in response to the search mask field value indicating that the data element value from the transaction-related data is to be written to the processing key value;
setting the first processing key value to a wildcard value if the search mask field value comprises a wildcard search mask field value;
comparing the first processing key value to one or more key values in the database;
if a match is found between the first processing key value and one of the one or more key values stored in the database, reading from the database a processing parameter value associated with the matching key value;
if a match is not found between the first processing key value and one of the one or more key values stored in the database:
creating one or more additional processing key values, the one or more additional processing key values being formed using one or more additional search masks obtained from the selected search mask table;
comparing the one or more additional processing key values to one or more key values in the database until a match is found between at least one of the one or more additional processing key values; and
reading from the database a processing parameter value associated with the matching key value;

sending the processing parameter value associated with the matching key value in the database to the first program.

12. The computer readable medium of claim 11, wherein the one or more key values in the database are defined by the user of the FSO computer system during the configuration of the FSO computer system, wherein the configuration of the FSO computer system occurs when a software program on the FSO computer system is initially set up for processing FSO transactions.

13. The computer readable medium of claim 11, wherein the database further comprises a plurality of processing parameter tables, wherein each processing parameter table comprises one or more rows, wherein each row in the processing parameter table comprises one processing parameter value and one key value.

14. The computer readable medium of claim 13, wherein the key definition is one of a plurality of key definitions in the database, wherein each of the plurality of key definitions in the database is associated with one of the plurality of processing parameter tables in the database.

15. The computer readable medium of claim 14, wherein the plurality of key definitions are stored in one or more key definition tables, each key definition table being associated with one or more of the plurality of processing parameter tables, wherein reading the key definition from the database comprises reading the key definition from one of the key definition tables.

* * * * *